(12) United States Patent
Mittelmark et al.

(10) Patent No.: US 8,083,835 B2
(45) Date of Patent: Dec. 27, 2011

(54) MICRO-IRRIGATION DEVICE, SYSTEM, AND METHOD FOR PLANT-BASED CLEANING OF INDOOR AIR AND FILTER BED BIOREGENERATION

(76) Inventors: Martin Mittelmark, Schuylerville, NY (US); Billy C. Wolverton, Picayune, MS (US)

( * ) Notice: Subject to any disclaimer, the term of this patent is extended or adjusted under 35 U.S.C. 154(b) by 0 days.

(21) Appl. No.: 13/062,580

(22) PCT Filed: Sep. 11, 2009

(86) PCT No.: PCT/US2009/056581
§ 371 (c)(1),
(2), (4) Date: Mar. 7, 2011

(87) PCT Pub. No.: WO2010/033423
PCT Pub. Date: Mar. 25, 2010

(65) Prior Publication Data
US 2011/0162273 A1    Jul. 7, 2011

Related U.S. Application Data

(60) Provisional application No. 61/098,314, filed on Sep. 19, 2008.

(51) Int. Cl.
*B01D 53/84* (2006.01)
*F24F 3/16* (2006.01)
(52) U.S. Cl. .................. 95/90; 95/210; 96/224; 96/290; 47/77
(58) Field of Classification Search .............. 95/90, 149, 95/210; 96/108, 243, 224, 290; 47/21.1, 47/66.7, 77
See application file for complete search history.

(56) References Cited

U.S. PATENT DOCUMENTS

| 3,717,953 A | 2/1973 | Kuhn et al. |
| 3,969,479 A | 7/1976 | Lonnes et al. |
| 3,991,514 A | 11/1976 | Finck |
| 4,315,599 A * | 2/1982 | Biancardi ............. 239/10 |

(Continued)

FOREIGN PATENT DOCUMENTS

CH    654978 A5    3/1986

(Continued)

OTHER PUBLICATIONS

National Aeronautics and Space Administration, Spinoff 2007, Plants Clean Air and Water for Indoor Environments, accessible at http://www.sti.nasa.gov/tto/Spinoff2007/PDF/basic_version_07.pdf, pp. 60-61.

*Primary Examiner* — Frank Lawrence, Jr.
(74) *Attorney, Agent, or Firm* — Jay R. Yablon

(57) ABSTRACT

A system and related method for purifying indoor air comprising: a filter bed comprising a growing medium suitable for growing plants rooted therein and configured to be capable of sustaining an airflow therethrough between a top surface thereof and a bottom surface thereof; a micro-irrigation system comprising a plurality of irrigation source outlets for delivering water to the filter bed in a substantially-uniform fashion; an active region of the filter bed comprising that region of the filter bed configured so as to substantially have the airflow flowing therethrough; and micro-irrigation system configured such that water therefrom is capable of being projected so as to reach at least 50% of a top surface area of the active region.

36 Claims, 17 Drawing Sheets

U.S. PATENT DOCUMENTS

| | | | |
|---|---|---|---|
| 4,784,835 A | 11/1988 | Fritz | |
| 4,844,874 A | 7/1989 | deVries | |
| 4,852,806 A | 8/1989 | Zeman | |
| 4,961,763 A | 10/1990 | Thompson et al. | |
| 4,975,251 A | 12/1990 | Saceman | |
| 5,044,120 A | 9/1991 | Couch | |
| 5,078,972 A | 1/1992 | Saceman | |
| 5,130,091 A | 7/1992 | Saceman | |
| 5,217,696 A | 6/1993 | Wolverton et al. | |
| 5,269,094 A | 12/1993 | Wolverton et al. | |
| 5,277,877 A | 1/1994 | Jeffrey et al. | |
| 5,315,834 A * | 5/1994 | Garunts et al. | 62/78 |
| 5,397,382 A | 3/1995 | Anderson | |
| 5,407,470 A | 4/1995 | Jutzi | |
| 5,430,972 A | 7/1995 | Wianecki | |
| 5,433,923 A | 7/1995 | Wolverton et al. | |
| 5,756,047 A | 5/1998 | West et al. | |
| 5,833,293 A | 11/1998 | Ludwig | |
| 5,934,017 A | 8/1999 | Ho | |
| 6,000,559 A | 12/1999 | Stopyra et al. | |
| 6,197,094 B1 * | 3/2001 | Thofelt | 95/211 |
| 6,230,437 B1 | 5/2001 | Wolverton et al. | |
| 6,616,736 B2 | 9/2003 | Massey et al. | |
| 6,663,769 B2 | 12/2003 | Hosoya | |
| 6,727,091 B2 | 4/2004 | Darlington | |
| 6,921,182 B2 | 7/2005 | Anderson et al. | |
| 2004/0230102 A1 | 11/2004 | Anderson et al. | |
| 2005/0186108 A1 | 8/2005 | Fields | |
| 2007/0058368 A1 | 3/2007 | Partee | |

FOREIGN PATENT DOCUMENTS

| | | |
|---|---|---|
| DE | 19521239 A1 | 12/1996 |
| DE | 19739060 A1 | 9/2000 |
| EP | 478203 A1 | 4/1992 |
| EP | 2042813 A1 | 4/2004 |
| EP | 1416229 A2 | 5/2004 |
| EP | 1563891 A1 | 8/2005 |
| GB | 2297087 A | 7/1996 |
| GB | 2307162 A | 5/1997 |
| WO | 2010/033423 A1 | 3/2010 |
| WO | 2010/033752 A1 | 3/2010 |
| WO | 2010/033752 A4 | 3/2010 |

* cited by examiner

| Status | | Airflow rate (approximate) CFM per sq. ft. filter bed | | Pressure drop (in W.G) | | | | |
|---|---|---|---|---|---|---|---|---|
| Pure pebbles | Thickness of Mixture (carbon and pebbles) | | | SP1 | SP2 | SP3 | SP4 | SP5 |
| fill the bottom of the basket | none | Max | 61 | 0.151 | 0.138 | 0.128 | 0.112 | 0.110 |
| | | Min | 36 | 0.068 | 0.060 | 0.058 | 0.051 | 0.050 |
| | 1" | Max | 58 | 0.272 | 0.255 | 0.248 | 0.230 | 0.228 |
| | | Min | 33 | 0.121 | 0.118 | 0.112 | 0.105 | 0.103 |
| | 2" | Max | 56 | 0.351 | 0.335 | 0.328 | 0.310 | 0.300 |
| | | Min | 32 | 0.155 | 0.150 | 0.148 | 0.142 | 0.140 |
| | 3" | Max | 53 | 0.410 | 0.405 | 0.395 | 0.380 | 0.378 |
| | | Min | 30 | 0.191 | 0.182 | 0.178 | 0.174 | 0.172 |
| | 4" | Max | 52 | 0.465 | 0.446 | 0.438 | 0.421 | 0.420 |
| | | Min | 29 | 0.210 | 0.204 | 0.200 | 0.194 | 0.192 |
| | 5" | Max | 51 | 0.500 | 0.480 | 0.475 | 0.456 | 0.452 |
| | | Min | 28 | 0.225 | 0.215 | 0.213 | 0.210 | 0.210 |

Fig. 1

MICRO-IRRIGATION DEVICE, SYSTEM, AND METHOD FOR PLANT-BASED CLEANING OF INDOOR AIR AND FILTER BED BIOREGENERATION

CROSS-REFERENCE TO RELATED APPLICATIONS

This application claims benefit of provisional application U.S. 61/098,314 filed Sep. 19, 2008.

FIELD OF THE INVENTION

This invention relates generally to a pollution control system and more particularly to an indoor air pollution control system utilizing symbiotically-related plants and microbes in a filter bed.

BACKGROUND OF THE INVENTION

Indoor air pollution is ranked as a leading cause of illness according to the Environmental Protection Agency and respiratory problems are now the top reason for admissions to hospitals in the U.S., over all other ailments. Given that people in the United States spend as much as 90% of their time indoors, a way must be found to effectively remove toxins from indoor air easily and effectively, while doing so in a way that limits heating and cooling costs.

The customary way to clean poor indoor air is through ventilation, by taking poor indoor air and expelling it outside the building, than replacing it with purer outdoor air. Unfortunately mechanical ventilation is effective only when outdoor air is relatively clean and when the cost of bringing the temperature of that air up to or down to a normal human comfort level is low. Today, however, outdoor air can be quite polluted, especially in large metropolitan centers, while the costs of heating or cooling outdoor air when it is brought inside are quite high. Thus a method must be found which limits mechanical ventilation and transforms the toxins within indoor air into harmless or even beneficial substances.

Most indoor air pollution control systems do not transform toxins within the air into harmless substances and as such they do not cut down dramatically on the need to mechanically ventilate a structure. Nor do most such systems clean the air of both particulate matter and airborne volatile organic compounds (VOCs) which off-gas into the air from carpets, furniture, wallboard, computers, copying equipment, cleaning agents and human beings themselves. With buildings becoming more and more air-tight to save on rising energy costs, the danger to human health has only increased. Therefore a cost-effective system must be found to deal with this problem.

Presently, there are many systems available for treating poor indoor air which contains both particulates and organic toxins. Hot and cold electrostatic precipitation, bag, filter bag and hepa filters and mechanical precipitators have been used, but all are substantially limited to the removal of particulate matter. Scrubbers—particularly wet scrubbers—provide the most effective means to control both particulate and gaseous pollutants. More often than not, however, these are used in industrial processes, but rarely have been used in residential or commercial structures. One reason for this is because of the increased humidity which wet scrubbers generate. This increased humidity can be trapped within a structure and give rise to mold and mildew problems.

Wet scrubbers typically employ or have within them a scrubbing zone where air is restricted and where gasses pass through layers of a filter with many impingement surfaces so that the gas is cleaned by agglomeration and absorption. In addition, wet scrubbers, by coating all surfaces within the filter bed with moisture, cause certain chemicals or VOCs to adhere to the moisture droplets, whereby the structure of these toxins is changed when they combine with the moisture itself. For instance, formaldehyde reacts with water to form methylene glycol, in the reaction $CH2O+H2O \rightarrow CH2(OH)2$. Or, in the presence of air and moisture at room temperature, formaldehyde readily polymerizes to form paraformadehyde—a white crystalline solid form of formaldehyde gas (typically 90-97% pure).

Standard chemical adsorption filters utilize certain substances which adsorb other substances or chemicals. In the case of air purification, activated charcoal is often utilized. But, while activated charcoal adsorbs certain types of volatile organic compounds, it is ineffective in adsorption of other VOCs such as Formaldehyde.

It is known that there are a wide range of VOCs—as many as 900 or more in some indoor air—and that no one form of extraction of VOCs has found to be effective for all. Some VOCs are adsorbed by activated carbon. Some dissolve in moisture. Therefore a mechanism or a combination of mechanisms needs to be employed which traps all the VOCs and eventually converts them into a harmless material to humans. Otherwise the need for ventilation still exists.

U.S. Pat. No. 5,756,047, in column 1 starting at line 30, surveys some of the prior art, stating that: "scrubbing may occur in a bed packed with a solid having a large surface area, thereby increasing the surface area at which the liquid and the gas may contact each other, as shown in Lonnes et al., U.S. Pat. No. 3,969,479; in a reaction chamber in which a mist of the liquid contacts the gas, as shown in deVries, U.S. Pat. No. 4,844,874; or in filters, as shown in Fritz, U.S. Pat. No. 4,784,835."

In contrast to the artificial systems of these above patents, plants naturally remove pollutants from the air. They do this by absorbing such pollutants through their leaves and then transporting the toxins down to the root system where the microbes, around the root system, consume as food and digest the toxins, changing them into harmless substances.

But these toxins will be digested by the microbes even if they pass directly through the filter bed, rather than being delivered thereto by the plants. Thus, it is known that by using a mechanical device which pulls air directly through the filter bed, indoor air can be pulled directly down to where the plants' root systems are and to where microbes congregate. As a result one plant can do the air-cleaning work of hundreds of plants, since the plant itself no longer serves as the main transport mechanism for these toxins and the number of microbes in the filter bed will multiply by virtue of their enhanced food supply. Further, plants grown within the filter bed have a symbiotic relationship with the microbes which digest the pollutants, fostering a conducive atmosphere which allows the microbes to flourish.

The prior art does appear to disclose the use of wet scrubbers which are, in essence, a filter bed in which plants are grown and in which microbes live. See, for example, U.S. Pat. Nos. 4,975,251; 5,044,120; 5,130,091; 5,217,696; 5,269,094; 5,277,877; 5,397,382; 5,433,923; and 6,230,437.

Thus, it appears to be well-known that moisture can scrub the air of certain well known VOCs such as formaldehyde and that if plants and microbes are grown in a filter bed, that such a configuration can also be used to purify indoor air. Yet this very same moisture can bring on mold and mildew if it finds its way into the dark and tightly-confining ducting of a building's HVAC system, or if excess amounts of moisture are trapped within a tightly-sealed building.

Thus, the moisture required to allow microbe transport within the filter bed and also to prevent mold and mildew—its delivery and distribution, and its absorption by plant roots and dissipation by evaporation and air flow—needs to be carefully and deliberately controlled.

Nonetheless, in all of the prior art in this field, the proper moisturizing of the plant/filter bed is barely considered, or is mentioned merely at the most-cursory level. The prior art appears to neither disclose nor suggest employing micro irrigation system in a way that ensures uniform moisture distribution. Nor is the prior art overly concerned with distributing water below the plant canopy or dealing with the potential for mold and mildew. Thus, for example, in an exemplary prior art U.S. Pat. No. 4,961,763 to Thompson, it is stated in column 8, starting at line 24:

"If desired, moisture sensors may be included with the air purifier for assuring that the soil bed remains moist. Either electronic or chemical moisture sensors may be used. For example, soil conductivity may be measured and used to indicate water content. If desired, instead of just measuring soil moisture, such electronic sensing may be employed for making controlled additions of water to the bed of soil in the air purifier. Drip irrigation may also be used."

In fact, the "drip irrigation" method disclosed in Thompson does not saturate the filter bed. It only saturates spots in the filter bed, in a non-uniform manner. Nor does the use of moisture sensors alleviate this problem, because each sensor is localized and so cannot be used to ensure a uniform distribution over substantially the entire active regions of the filter bed. This is not conducive to the maintenance of microbes and microbial transport within the bed, because what is also critically important is the uniformity of the irrigation delivery. To date, this uniformity of irrigation simply does not appear to have been addressed in the prior art, and appears to be a shortcoming in the state of the art.

In particular, it can be demonstrated that drip irrigation is a very inefficient way to saturate a filter bed. At best it only provides a wet spot of maybe an inch to an inch and a half around each dripper. Such "drippers" are designed specifically to get moisture only to where the roots of the plant are located, not to saturate the entire filter bed so as to allow microbes to live and work in the entire filter bed. Thus, while suitable to maintain the plant life, such drip systems are less-than-optimal for an air cleansing system in which microbial maintenance is equally important not only to plant maintenance, but to the removal of toxins in air which is transported through the filter bed for the express purpose of removing toxins by feeding them to microbes. The purpose of a dripper is to conserve water by only delivering water to the plant roots, not to deliver water throughout the bed and sustain microbial transport for toxin removal and filter bed bioregeneration.

It would be much preferred to evenly deliver irrigation to the surface of the entire filter bed for at least 2, and up to 12 to 24 inches in all directions from each individual irrigation source outlet, in combination with a suitable network of source outlets, thus providing saturation of the entire filter bed so as to allow microbes to live and work in the entire filter bed. Further, with a more-uniform irrigation delivery, even saturation of the filter bed gives added capability to the wet scrubber effect, independently of this positive microbial impact, and serves to bioregenerate the filter bed in a completely natural manner.

Beyond the limitations of drip irrigation, Thompson shows irrigation source outlets which are not placed close to the filter bed surface (within twelve inches or less of the bed surface, and even below the bed surface). Nor are they placed below the majority of leaves of the plants growing in the filter bed. Thus, leaves will deflect the irrigation delivery, further compounding the problem of non-uniform irrigation delivery. It is much preferred to place the moisturizing emitters (irrigation source outlets) below the surface of the leaf canopy of the plants grown within the filter bed.

In sum, it is desirable to have a device, system and method by which moisture can adequately saturate the filter bed in an indoor air purification system which acts as a wet scrubber and provides proper sustenance for the needs of plants and microbes which live within the filter bed, and simultaneously, which does not give rise to mold and mildew within the building.

It is further desirable to ensure a highly uniform delivery of irrigation to the plant/filter bed, not only to maintain the plant matter, but also to facilitate microbial transport to bioregenerate the filter bed and enhance the area over which wet scrubbing can take place. This includes improving the method of delivering water to the plant/filter bed, and ensuring that the plant matter itself does not interfere with this delivery.

SUMMARY OF THE INVENTION

A system and related method for purifying indoor air comprising: a filter bed comprising a growing medium suitable for growing plants rooted therein and configured to be capable of sustaining an airflow therethrough between a top surface thereof and a bottom surface thereof; a micro-irrigation system comprising a plurality of irrigation source outlets for delivering water to the filter bed in a substantially-uniform fashion; an active region of the filter bed comprising that region of the filter bed configured so as to substantially have the airflow flowing therethrough; and micro-irrigation system configured such that water therefrom is capable of being projected so as to reach at least 50% of a top surface area of the active region.

BRIEF DESCRIPTION OF THE DRAWING

The features of the invention believed to be novel are set forth in the appended claims. The invention, however, together with further objects and advantages thereof, may best be understood by reference to the following description taken in conjunction with the accompanying drawing(s) summarized below.

FIG. 1 contains a chart illustrating—for example, not limitation—the desired airflows for this invention, in relation to various filter bed and pressure drop configurations, which is one means of quantifying the porosity of the filter bed.

FIG. 2 is a schematic diagram illustrating a conventional micro irrigation system.

FIG. 3 schematically illustrates an alternative conventional micro irrigation system.

FIG. 4 shows how water emitters may be attached to a lateral water feed line.

FIG. 5 is a perspective view illustrating a dripper emitter in operation.

FIG. 6 is a perspective view illustrating a sprinkler emitter in operation.

FIG. 7 is a perspective view illustrating a bubbler emitter in operation.

FIG. 8 illustrates a schematic top view of a micro irrigation system used in combination with a preferred embodiment of the invention.

FIG. 9 shows a side plan view of the exterior of a high efficiency plant air purifier, according to a preferred embodiment of the invention.

DETAILED DESCRIPTION

Figure 2:
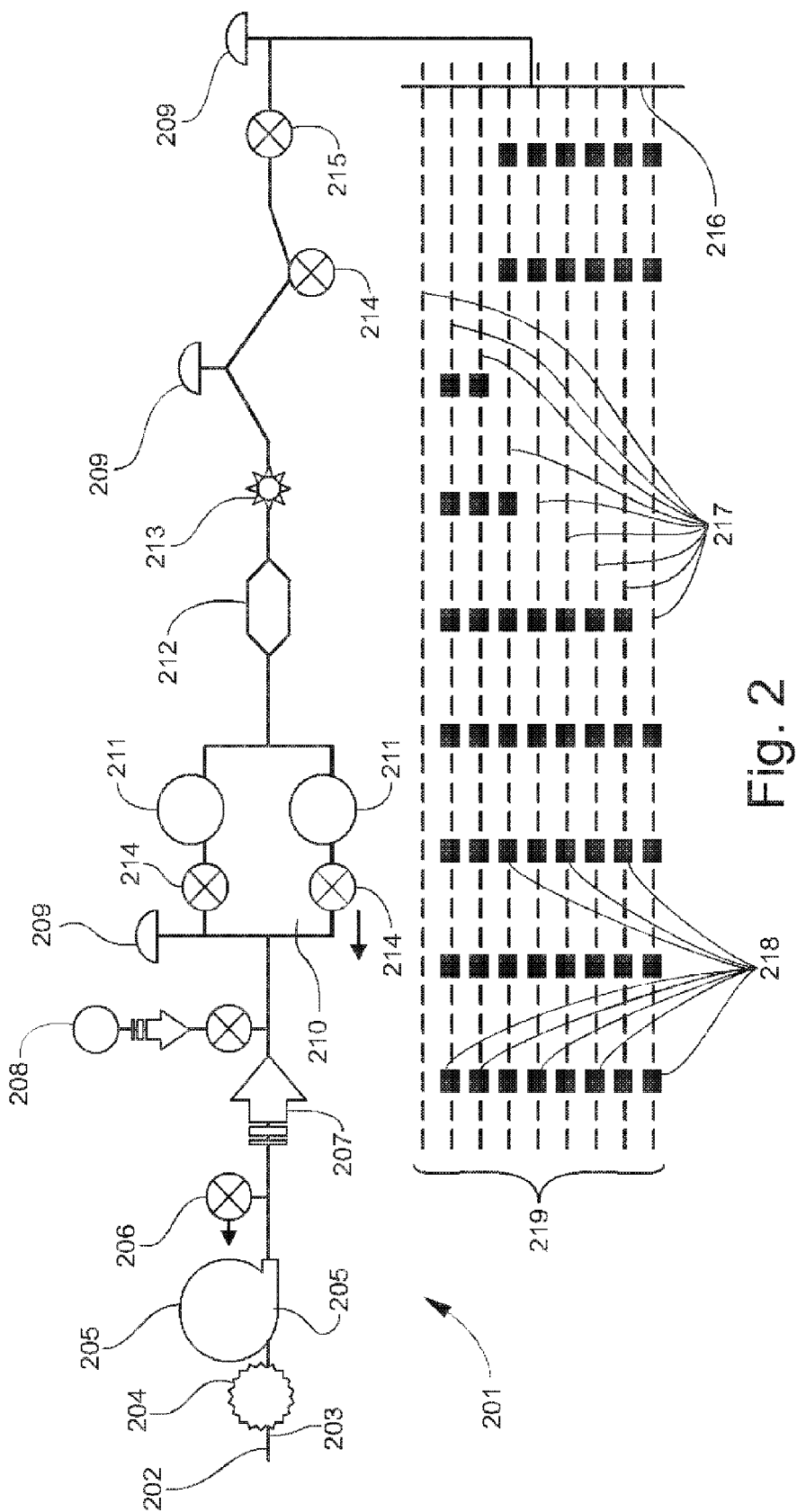

The invention disclosed herein is designed to capture particulate matter and transform harmful organic compounds in indoor air, into harmless and beneficial substances that need not be ventilated to the outside.

The present invention uses among other things a lightweight aggregate plant microbial filter with a wet scrubber component. The scientific basis for air purification with such a filter is due partly to the cooperative growth of both the plants and the microorganisms (microbes) associated with the plants. A major part of the treatment process for the degradation of organics is attributed to the microorganisms living on and around the plant root systems.

Once microorganisms are established amongst plant roots, in most cases they form a symbiotic relationship with the plants. This relationship normally produces a synergistic effect resulting in increased degradation and removal of organic compounds specifically around the plant root systems where the microbes are found. Products of the microbial degradation of the organics are absorbed and utilized as a food source for the microbes. Microorganisms also utilize metabolites released through plant roots as a food source. By each using the others' waste products, a reaction is sustained in favor of rapid removal of organics from both the filter bed and from the air stream passing through the filter bed. Electric charges associated with the plant's root hairs also react with opposite charges on airborne particles causing them to adhere to the plant roots where they are removed from the air stream and slowly digested and assimilated by the plants and microorganisms.

The various invention embodiments disclosed herein measure the amount of moisture within a filter bed. Responsive to this measurement, the invention supplies just the right amount of moisture to that filter bed when necessary, with a substantially uniform distribution throughout the active area of the filter bed to enable microbe transport for bioregeneration of the filter bed, and prevents excess moisture from being pulled into the ducting system of the HVAC system by shutting off the blower when the sprinkler system of the plant air purifier is functioning or during the time when water is draining from the filter bed immediately after the micro irrigation sprinklers have shut off. Additionally, the invention removes excess water which has passed through the filter bed, by either draining it away, or returning it to a reservoir with a reuse conduit conveying this water for reuse to the source outlets, for re-wetting the filter time and again so as to conserve water. In addition, some embodiments comprise a solenoid switch which turns the water from the in house plumbing on and off, and a filter screen that removes out any large impurities which somehow may have left the reservoir so as to trap them before water goes through the pump and up into the micro irrigation system. Some embodiments may also compromise a reed switch which acts as a shut off to water coming into the reservoir, and/or a food entry portal (e.g., screw-off cap) proximate the reservoir to introduce plant food.

In addition, employing a micro-irrigation water delivery system, the invention provides for substantially even distribution of moisture over the bioregenerative portion of the plant/filter bed, ensuring microbial transport and enhancing the wet-scrubber effect. It also lessens deflection of the micro sprinkle's flow by providing a canopy or trellis which keep leaves and vines off the filter bed itself. Lastly, the invention comprises a transparent housing around the plant air purifier when the planter is hooked directly into the ventilation system of the building with an intake duct and exit duct so as to permit passage of necessary light for plant growth and substantially seal the plant/microbe system within the building's ductwork. When referring to a "building" throughout this disclosure, what is envisioned is any form of habitable structure within which one might normally place an air heating and/or cooling system, including but not limited to office buildings, commercial spaces such as stores and shopping malls, and, of course, residential units such as apartments and homes. Within the scope of this disclosure and its associated claims, we do not rule out also employing this invention in a motor vehicle, for example, with plants mounted beneath the rear window and tied into the vehicles air circulation system.

It is desirable that the irrigation source outlets be capable of projecting water emanating from each said irrigation source outlets over a radius of at least two inches from said irrigation source outlet (emitter), and that the outlets be configured relatively to one another so that the water projected from one outlet overlaps with the water projected from directly-adjacent outlets whereby substantially all areas of the bioregenerative portion of the filter bed are directly saturated by at least one outlet/emitter. However, to avert the circumstance where someone might purposely include a few outlets with coverage of less than two inches just to avert the true spirit of the invention, it is also recognized that someone might configure only at least 50%, or 60%, or 70%, or 75%, or 80% or 85%, or 90% or 95%, or substantially all of the source outlets with a reach of more than two inches.

One may define an "active region" of the filter bed to comprise that region of the filter bed configured so as to substantially have the airflow flowing therethrough. That is, this is the region of the filter bed that is aligned with the ductwork, so that air will be pulled or pushed through this region then the air movement is activated. A remaining part of the planter bed may not be aligned with the ductwork, but be included predominantly for decorative/aesthetic reasons, and so is not regarded to be part of the "active region." Given the minimum two inch projection mentioned above, and with this definition, the micro-irrigation system is preferably configured such that water therefrom is capable of being projected so as to reach substantially all of a top surface area of the active region. However, to avert the circumstance where a system might be designed to project water to a smaller portion of the active region just to avert the true spirit of the invention, it is also recognized that someone might only provide coverage over only at least 50% of the top surface area of the active region, or 60%, or 70%, or 75%, or 80% or 85%, or 90% or 95% of the top surface area of the active region, and intentionally withhold water distribution from the remainder of the filter bed. Nonetheless, such workarounds are considered to be within the scope of this disclosure and its associated claims.

It is also to be observed that the only portions of the filter bed which can bioregenerate are those portions which are saturated, because microbes cannot effectively transport to those regions which are not saturated and so will not regenerate those regions. We shall refer (and have referred) to this as the "bioregenerative portion" of the filter bed. This "bioregenerative portion" of the filter bed is thereby defined as that portion of the filter bed over which the irrigation system is configured to provide substantially-uniform saturation, because this substantially coincides with that portion of the filter bed which is capable of bioregeneration.

Because the micro-irrigation delivery is crucial to ensuring a uniform distribution of water throughout the plant/filter bed, which in turn sustains microbial transport and enhances wet scrubbing and also helps to achieve a proper, balanced moisture level, it is important to discuss at length the nature of a suitable, exemplary micro-irrigation system.

As used herein, micro irrigation includes within its scope all methods of frequent water application, at low flow rates, under low pressure. This low pressure is lower than that normally supplied by a community's water supply system (typically about 55 psi), and in all cases not to exceed 30 to 35 pounds per square inch. Micro irrigation systems allow for a high level of control over water application, so that water can be applied only when and where needed. The components of a micro-irrigation system may comprise pipes, tubes, water emitting devices, flow control equipment, pressure reducing mechanisms, installation tools, fittings and accessories.

As used herein, a micro-irrigation (moisturizing) emitter, or micro-irrigation source outlet, refers to a small delivery outlet which, under low-pressure, sprays, mists, bubbles or sprinkles water to the plant/filter bed. As noted earlier, drip outlets are not suitable, because these only saturate spots in the filter bed, in a non-uniform manner. These outlets deliver water onto the soil surface very near a plant, or even below the soil surface directly into the plant root zone.

Preferably, a micro-irrigation (moisturizing) emitter comprises a device (for example, not limitation, made from plastic, and including a metering capability) that delivers a small but precise discharge. The quantity of water delivered from each of these emitters is relatively low. These emitters dissipate water pressure through the use of long-paths, small orifices and/or diaphragms. Optionally, an emitter may be pressure-compensating, meaning it discharges water at a constant rate over a range of pressures.

Emitters suitable for use as part of the combination of elements of this invention may deliver water in two different modes: bubbler and micro-sprinkler. In bubbler mode, water "bubbles out" from the emitters. In micro-sprinkler mode, water is sprinkled, sprayed, or misted. Emitters for each of these modes may be employed in several discharge increments. Because it is desired to sustain a substantially-even saturation of the filter bed and since drip irrigation supplies water saturation only about an inch to an inch and a half beyond each dripper, we exclude micro irrigation systems which use drip irrigation—defined here as emission reaching no further than an inch to an inch and a half from the emitter—as its main means of applying moisture to the filter or soil since it results in an uneven, spotted saturation of the filter bed.

Since micro sprinklers can provide as much as a half gallon of water each minute, and since horizontal wicking of material within a filter bed used in these plant air purifiers is often very limited, it is much better to rely on substantially-uniform, even wetting of the surface of the filter bed through the use of a micro irrigation system and letting gravity saturate the filter beds depth.

Micro-sprinkler emitters suitable for use in accordance with this invention are commonly known as sprinkler or spray heads. There are several suitable types These emitters operate by throwing water through the air, usually in predetermined patterns. Depending on the water throw patterns, the micro-sprinklers are referred to as mini-sprays, micro-sprays, jets, or spinners. The sprinkler heads are external emitters individually connected to lateral pipe typically comprising "spaghetti tubing," which is very small (⅛ inch to ¼ inch) diameter tubing. The sprinkler heads may be mounted on a support stake or connected to the supply pipe. Micro-sprinklers are desirable because fewer sprinkler heads are necessary to cover larger areas. Yet the spray from each emitter does not usually distribute beyond three or four feet. The flow rates of micro-sprinkler emitters vary from 3 gallons per hour (GPH) to a maximum of 30 GPH depending on the orifice size and line pressure, which is a maximum of 0.5 gallons per minute (GPM).

Now, let's turn to examine the other components of a suitable Micro-irrigation system for use in accordance with the invention.

Irrigation pipeline systems are generally described as branching systems. Various branches are given names such as main, submain, and lateral.

The basic components of a micro irrigation system may also comprise a pump and power unit, a backflow prevention device if chemicals are used with water, a filter, a water distribution system, and some devices for controlling the volume of water and pressure in the system. If the water source is from a city/municipal/rural water supply, a direct connection is possible.

The control portion of a micro irrigation system may comprise a combination of the following devices: pressure regulator, valve, vacuum relief valve and timing clock or controller. A flow meter should be used to measure the amount of water. Pressure gauges monitor the water pressure at the pump and other locations. Equipment to inject fertilizers into the water line may also be used. Backflow prevention devices are desirable to prevent contamination of the water source.

In the present invention, the air purifier is in reality a planter. It is an open topped container with sides and a bottom, which holds a tray or plurality of trays or baskets, each with a porous bottom. The trays are substantially mutually-adjacent. Within the trays or baskets are placed a mixture of growing material, which might comprise activated carbon, expanded shale, perlite, clay pebbles, fibrous material or any similar growing material with suitable porosity required for both drainage and air circulation since this material also serves as a wet scrubber. Within this growing material is rooted a plant or a number of plants. Microbes congregate around the root system of the plant(s). Air is moved down (or up) through the filter bed composed of the growing material, plant(s) and microbes, by means of a mechanical device which is either attached to the planter itself or is part of the HVAC to which the plant/growing material purifier is attached. The mechanical device used to move (pull or push) the air through the filter bed may comprise an induction fan or another mechanical mechanism.

In a system wherein the filter bed acts to purify air, air has to easily be pulled or pushed through the filter bed and so that bed must be more porous than normal soil. Specifically, if this invention is to be used as a substitute for a conventional air filter, then the filter bed should comprise a growing material sufficiently porous to enable an rate of airflow therethrough which is substantially comparable to that of a conventional, non-plant-based filter otherwise required to purify air for a comparable space. FIG. 1 contains a chart illustrating—for example, not limitation—these envisioned airflows in relation to various filter bed and pressure drop configurations. In particular, FIG. 1 summarizes the CFM and static pressure when filter bed's depth is increased, and the SP1-5 are the readings taken at various points within an experimental test system denoted in FIG. 17. The (non-limiting) dimensions of the device are shown in inches. Because of the filter beds porosity and the flow-through of air, in addition to water absorption by plant roots, the filter bed will dry out much faster than usual, and so more frequent and sustained and carefully-controlled irrigation is required. Providing and controlling this irrigation in an optimal fashion, then becomes quite important.

As has been alluded to already, this invention is not just limited to pulling the air down through the filter but also comprises pushing the air up through the filter, if desired. In one preferred embodiment, the fan is placed below and to the side of the filter bed and the filter bed is within a series of trays or baskets, see, e.g., FIG. 16. Said tray or trays have lips upon them which rest on the top edge of the planter and on the other trays so as to make sure that all air is pulled only through the filter bed and through the small porous holes of the trays or baskets holding the filter bed material. Atop or buried within the filter material are components of a micro irrigation system with characteristics described above, which help to uniformly saturate and keep the filter bed moist. At the same time, at least one moisture sensor is inserted into the filter bed. When the moisture level falls below a certain level, the irrigation system goes on, spraying or distributing moisture throughout the filter bed so as to bring moisture back to the necessary and appropriate level. This same moisture sensor may turn off the micro irrigation system when the appropriate level of moisture has been reached or exceeded.

As an alternative to the moisture sensor and controller, a timer may be used to turn the micro irrigation system on and off. The irrigation system is preferably attached to a water reservoir which recirculates the water which passes through the filter bed. However it could alternatively be attached directly to the indoor plumbing of the structure wherein the planter is situated and functions without a recirculation system at all. In one embodiment, a programmed relay controls air flow, and this may or may not be responsive to one or more moisture level sensors. Alternatively, a turning on of the sprinklers could turn off the air flow (blower). Or a timer may be employed to turn on (or off) the blower a predetermined amount of time after or before the sprinklers turn off (or on). That is, in many of these embodiments, a controller may control an airflow through the filter bed, in predetermined relation to when water is being delivered to the filter bed.

As water passes through the filter bed, any excess moisture not held or adsorbed by the filter bed passes through the filter bed itself and drops down into the empty chamber below where it then passes out of the planter and either goes back into the recirculation reservoir or down a drain.

Recirculated water passing through the filter bed itself can removes particles of dust or other impurities form the water, and may even remove chlorine found in the community's water supply. This is an additional benefit beyond the cleaning of indoor air.

Chlorine, of course, has an adverse effects upon plant life. Therefore, an additional filter and/or strainer may be installed for passing water after it has gone through the filter bed and prior to the water recirculating back through the micro irrigation system. An automatic backwash system may be attached to the unit which backwashes impurities caught by the strainer and so washes them down the drain. In the alternative, the strainer may be removed and cleaned manually.

If a water reservoir is installed so that excess water is allowed to re-circulate through the micro irrigation system, than a float device is installed in the reservoir so that water is replenished automatically from an indoor plumbing line feed. When water in the reservoir goes below a certain point the water feed from the building's water supply is automatically shut off and it is turned on again only after excess water from the planter has had a chance to drain back into the reservoir—water which has passed through the filter bed in the planter.

Such a reservoir recirculating system operates such that once water leaves the reservoir, excess water which passes through the filter bed is allowed to drain back into it and any additionally needed water to fill the reservoir is supplied by the in-house feed. In one exemplary, non-limiting embodiment, this could work as follows:

Initially a solenoid valve attached to the indoor plumbing water feed line opens and water begins to fill a 6 gallon plastic water reservoir. When the reed switch is activated within the interior of the reservoir it signals that the tank is full. A message is sent to the computer relay which directs the solenoid valve for the indoor plumbing supply to shut off. Upon a signal from the moisture click controller that water is needed in the filter bed of the planter the pump is turned on and it propels water from the reservoir into the micro sprinkler heads which than moisten the filter bed. The micro sprinklers continue to operate until the moisture click controller indicates that there is now sufficient moisture within the filter bed, whereupon the pump shuts off. The irrigation period can last anywhere between 12 seconds and one minute and may put as much as two gallons of water through the filter bed. Meanwhile excess purified water drops down through the filter bed into the lower chamber of the planter and drains into the reservoir for reuse. Approximately 3 minutes after the sprinkler system is turned off the induction fan is activated and pulls air through the filter bed and out into the HVAC system. Upon the induction fan starting up and if the reed switch has indicated that more water is necessary in the reservoir, the solenoid valve controlling the indoor plumbing water intake feed line is opened and water rises in the reservoir to the level of the reed switch which signals the computer relay to close the solenoid valve cutting off the indoor plumbing feed line. And so the system operates ad infinitum. From time to time liquid plant nutrient is preferably placed directly into the reservoir, there being, for example, a five inch screw-on lid on top of the reservoir. Such nutrient should be placed in the tank prior to the indoor plumbing feed line being opened.

Replenishment of lost water in the reservoir which has been retained by the filter bed or water which has dissipated into the room because the air in the structure absorbs it is replenished from the structures indoor plumbing supply line.

When moisture is replenished within the filter bed, the fan or mechanical device which pulls air through the filter bed is disabled. This is so water droplets are not exhausted through the fan and possibly into the ventilation system of the building. Were moisture or excess moisture to accumulate in the ductwork of the ventilation system it could lead to the buildup of mold and mildew and provide a breeding ground for adverse bacterial growth. It could also lead to sick building syndrome.

When moisture replenishment of the filter bed is complete and excess water has had enough time to drain off, the fan or mechanical device which pulls air through the filter bed is allowed to function once again. Hence an electrical device or timer is used to determine when the elapsed time for draining has taken place. A programmed computer relay sets the time for such series of functions to be performed. Or, this may be based on sensors which detect the state of drainage.

A charcoal filter or other filter may be hooked up to the indoor plumbing intake line going into the water reservoir or the irrigation system of the planter so as to remove chlorine or other impurities found in normal tap water itself.

An ultra violet light may be attached to the planter or be installed within the HVAC system so as to further purify the air and kill mold or other forms of harmful growth.

This invention purifies air within a room or within an entire structure. Atop the planter there may be an easily detachable or permanent canopy or trellis-like structure which allows vines of the plants grown within the filter bed to rest. Since the desire is for the micro irrigation sprinklers to evenly saturate the entire filter bed, vines leaves or stems of the plant(s) might well deflect such water streams if parts of the plant were to lie directly on or very near the filter bed itself. These might deflect the sprinkler(s) spray and so result in the filter bed not being evenly saturated. By letting hanging parts of the plant (s) rest on the canopy, this problem may be greatly reduced.

The induction fan may or may not be variable speed and may or may not be activated by a timer or by a sensor which monitors levels of airborne pollutants found within the air of the room or within the structure itself.

The planter may function with or without plants initially, and within this planter, microbes, which have a symbiotic relationship with plants, live. These microbes may be placed in the filter bed artificially or will grow there automatically when certain plants live within the filter bed. Of particular interest are those microbes which actually digest toxins in poor-quality indoor air. These microbes bio-regenerate the filter bed which absorbs VOCs and other toxins found within the air of the room where the planter is placed or remove toxins from the air in the entire structure itself where the high efficiency plant air purifier is placed. Regeneration of the filter bed material via suitable microbes eliminates or greatly lessens the need of filter bed replacement. The filter bed can also adsorb radon gas and convert it to lead which can then be absorbed by the plant roots and concentrated.

Regularly potted plants vary in their ability to remove volatile organic chemicals (VOCs) from the indoor environment. The higher the transpiration rate of a plant, the more effective it is in removing VOCs. At higher transpiration rates, more ambient air is pulled down around the plants' root zone (rhizosphere). Microbes naturally live and thrive in the plants' rhizosphere. Through adaptation, these microbes break down chemicals into components that serve as a food source for themselves and their host plant.

When plants reside in a high efficiency plant air filter, the movement of air by the use of an electric fan or similar blower device is very much greater than the movement through a plants' transpiration process. Therefore, the plants' transpiration rate becomes comparatively insignificant. In these filters, a plants primary function is to host microbes within their rhizosphere, and so any plant, regardless of transpiration rate, is effective for use in a high-efficiency plant air filter.

As air is pulled through the filter bed whose individual particles are coated with moisture supplied by the micro irrigation system where sprinklers are used, many VOCs and other contaminants are removed from the polluted air, including certain pollutants which would not ordinarily be adsorbed by a chemical adsorbent such as activated carbon. These pollutants attach themselves to the filter beds moist surface areas or to the moisture droplets in the filter bed itself. As a result some are altered in their chemical makeup as in the case of formaldehyde which might be changed into methalene glycol or transformed into paraformaldehyde, and some are changed from a gas into liquid or solid form and are trapped within the filter bed where they are digested by microbes.

The wet scrubber also extracts fine dust particles from the air, purifying it in many cases as well as a hepa filter might. But unlike a hepa filter, this system does not require filter material replacement since excess water and microbes which live in the filter bed cleanse it of any impurities or toxins trapped therein. When the microbes digest the impurities or toxins, this bio-regenerates the filter bed. Because the sprinklers which are part of the micro irrigation system turn on automatically whenever the filter bed material gets below a certain level of moisture, preferably as measured by the moisture sensor(s) placed within the filter bed, and because of the substantially uniform distribution of moisture to the bioregenerative portion of the filter bed, there is always adequate moisture within the bed and so its wet scrubber effect never ceases to function.

Since the plant air purifier purifies air within the entire structure, less mechanical ventilation within the building is necessary, and little or no exchange with outdoor air is required. As a result heating and cooling costs are reduced significantly. In order for the planter to function when it is attached to the HVAC system, air within the building has to pass into a room or chamber where the planter is located and moved through the filter bed, where it than enters the return air feed. Such a room might be a central atrium area. In the alternative the HVAC system must allow the air from the system to pass through a containment chamber within which the plant purifier is set. This may entail the planter being placed in a clear housing, perhaps of Plexiglas, acrylic or glass (but not limited thereto) which allows necessary light to reach the plants in the air purifier and substantially seals the planter system within the building's ductwork. This containment chamber might be classed as a modified terrarium. This terrarium should have at least one duct line which allows the dirty air to come in above or below the filter bed and another duct which draws the purified air out from the opposite side of the filter bed after it has passed through the filter bed itself. In short, when the planter system is used as an integral part of the ductwork, it is necessary for the entire ducting system to comprise a closed conduit (except where air ingress and egress is desired), and a clear housing produces the necessary closure of the ductwork incorporating the plant system while at the same time allowing photosynthesis necessary for plant life to be sustained.

Let us now discuss in further detail, how the high efficiency plant filter works in conjunction with a building's mechanical ventilation system.

As mentioned earlier the high efficiency built in air purifier comprises: a filter; microbes and plants which grow in the filter; a mechanism which either pulls or pushes air through the filter; a micro irrigation system which uses at least one bubbler or micro sprinkler or other emitter to uniformly moisten the filter bed; a space below the filter from which air is drawn in or expelled; and means by which excess water that passes through the filter either drains away or is stored.

Buildings, especially commercial buildings, have mechanical ventilation systems designed to remove unpleasant smells and excessive moisture, introduce outside air, and keep interior building air circulating to prevent stagnation of the interior air. The built in high efficiency plant filter interacts with the buildings ventilation system in four different alternative embodiments:

First, it may be free standing and require no separate ducting whatsoever, beyond the ducting already pre-existing within the building/structure. In this case, air from within a room is pulled down through the plant filter and then exhausted back into the same room. Thereafter, the purified air is pulled through the return air grille and recirculated throughout the building via its preexisting ducting.

Second, there may be a duct below the filter and on its side so that the clean air is ducted back into the same room (see FIG. 13).

Third, there may be a duct below the filter which pulls all the purified air directly into the air circulation system of the building and bypasses the outdoor exhaust or has the damper shut on the outdoor exhaust when the plant air purifier is operating. In this way, all purified air is allowed to recirculate throughout the structure much like clean outside air.

Fourth, finally, the clean air plant purifier may be enclosed in a clear housing and integrated directly into a duct which sends polluted air into the enclosed chamber and into another duct and takes the purified air out from the chamber after it has passed through the filter. Whereupon the purified air is than ducted back into the air circulation system of the structure. In essence, the plant air purifier in this instance becomes integral with the ductwork, and the clear housing is what makes this integral while at the same time allowing for light passage for photosynthesis.

The third alternative specified above may be employed in connection with a central atrium. In this case, all return air within the building is exhausted into the room containing the atrium and the polluted air is pulled through the filter bed of the arboreum filter where the plants and microbes reside. Then, the purified air is ducted back into the air circulation system where it recirculates throughout the building, entering each room anew through the supply air vents within each room of the structure.

To the extent impurities and excess moisture are removed from indoor air and there is sufficient oxygen within the structure, the need for outside air is minimized, whereupon the fresh air intake can be shut down and the building's exhaust air outlet can be closed, thus lowering heating and cooling costs. Outdoor airflow is modulated by closing the outdoor air damper and the exhaust damper. This system as heretofore disclosed utilizes only a small amount of moisture in relation to the overall volume of air purified and so the indoor air's humidity is only slightly raised. It is also desirable to subject air to ultraviolet light once that air leaves the planter. Combined with the microbial action, the UV light renders this system very hostile to mold and mildew. In addition the system is deactivated when there is excess water in or traveling through the filter.

What is unique about this filter is that it combines three different filtration technologies into the system: (1) standard chemical adsorption; (2) wet scrubber and (3) bioregenerative technology. It does so by ensuring that the filter bed is substantially evenly saturated and the moisturizing mechanism is situated in such a way that leaves and vines of the plant(s) grown in the filter bed do not deflect most of the moisture only to certain areas.

With this invention, a body of airborne VOCs which would normally not be caught using a standard chemical adsorption filter now remain in the filter bed in a liquid or solid form and ultimately become food for microbes.

As regards the irrigation system previously discussed, this system uses a water stream coming from a micro irrigation system which employs non-drip micro sprinklers to moisten the filter bed comprising activated carbon, expanded shale pebbles, plants, microbes and now moisture. This combination of elements allows the filter to have added capabilities, and particularly to capture a much larger range of particles and pollutants and then digest those substances and so transform them into harmless substances which then serve as nutrients for plants eliminating the need for their removal through mechanical ventilation. Further, because of the top down moisturization process of this system, wicking action commonly-utilized in the prior art is no longer necessary and hence a major part of the filter bed need not sit below the surface of the water where it cannot trap airborne pollutants. In the best of circumstances, prior art utilizes about 30% of the filter bed for air purification when wicking action is used. This system is able to utilize 100% of the filter bed for air purification and 100% of the filter bed can be bio-regenerated as well, presuming that the system designer decides to use substantially all of the filter bed for bioregeneration with a substantially uniform water distribution. When any area of the filter bed cannot be kept moist microbes cannot flourish and their ability to clean out that part of the filter bed is severely limited. Prior art, especially that which uses wicking action, is not able to keep the surface of the filter bed moist and areas of the filter bed not kept moist must be replaced or will become saturated and off gas toxins back into the air of the structure in which it is housed. The disclosed method of uniform irrigation via micro-irrigation eliminates this problem.

By hooking this system into the HVAC system of a building the need for mechanical ventilation is lessened and energy savings result because there is less need to heat or cool great volumes of outside air which ordinarily would have been brought into the structure.

With the foregoing in mind, we now review in detail, the various drawings which illustrate the invention in its various embodiments as heretofore described.

FIG. 1 contains a chart illustrating—for example, not limitation—the envisioned airflows for this invention, in relation to various filter bed and pressure drop configurations. Airflows are stated in cubic feet per minute (CFM) per square foot of the active filter bed surface. The SP references are to positions illustrated in FIG. 17.

FIG. 2 shows a conventional micro irrigation system 201 for watering plants. This system has a water source 202 attached to a main water line 203 which is connected to a pre-filter 204, a pump 205, a pressure relief valve 206, a backflow prevention device 207, a chemigation injection system for placing nutrients in the water for the plants 208, a series of air vents 209, a sand filter 210 with backwash capabilities, a screen filter 211, a pressure control 212, a water meter 213, drains 214, a solenoid valve 215, a sub main line 216, and a series of lateral lines 217 to which are attached a number of emitters 218. Plants are grown in a plant area 219 which incorporates the entire area through which the lateral lines run.

Figure 3:
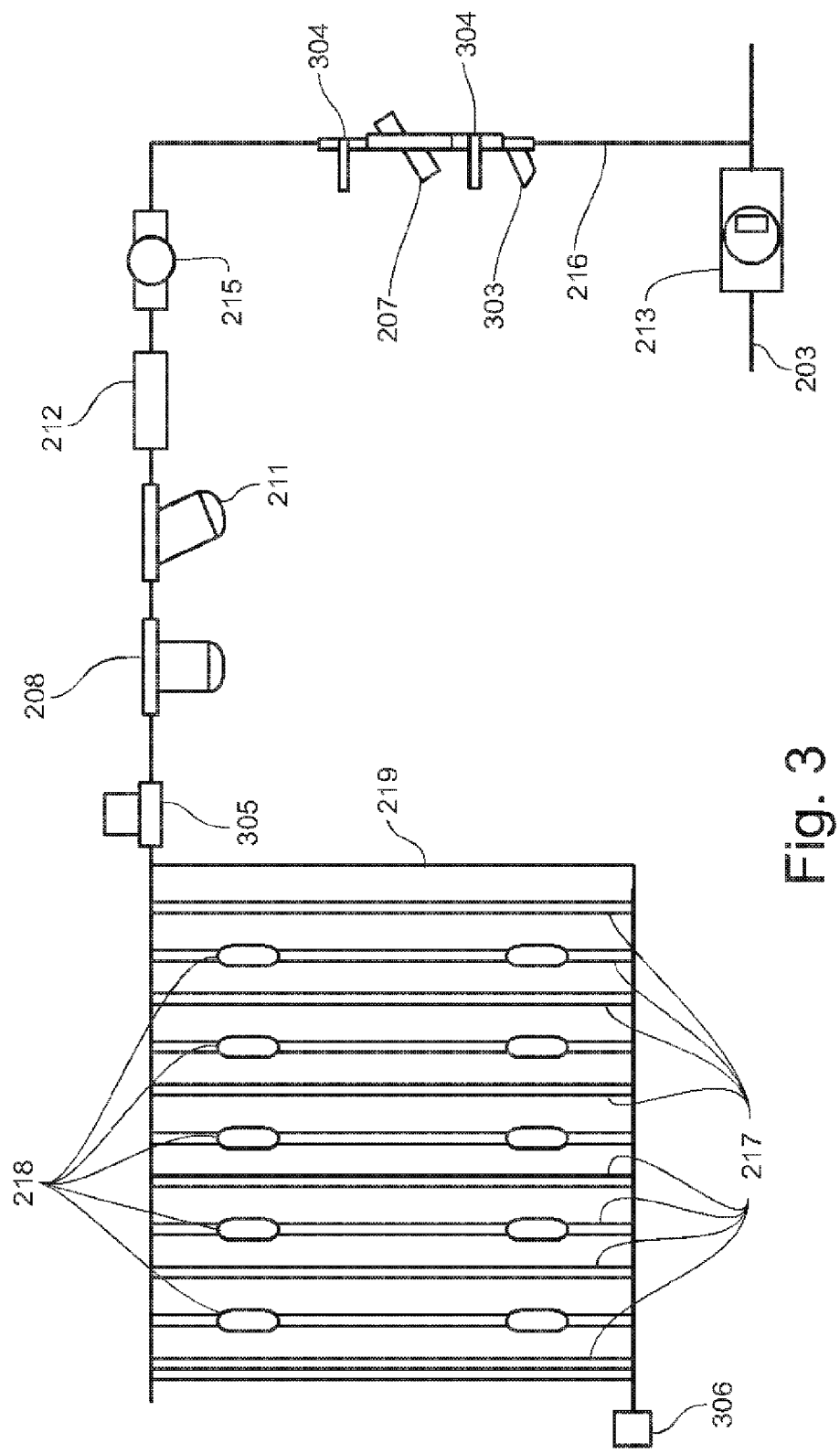

FIG. 3 shows another variation of a conventional micro irrigation system, showing various parts of the system after a pressurized water feed. This system too has a main line 203, a water meter 213, sub main line 216, a series of lateral lines 217, a plurality of emitters 218 and a plant area 219. It has a strainer 303, isolating valve 304, a backflow prevention device 207, a solenoid 215, pressure regulator 212, a mesh filter 211, a tech filter trilurain injection device 208, an air relief valve 305, and an automatic flushing valve 306.

Figure 4:
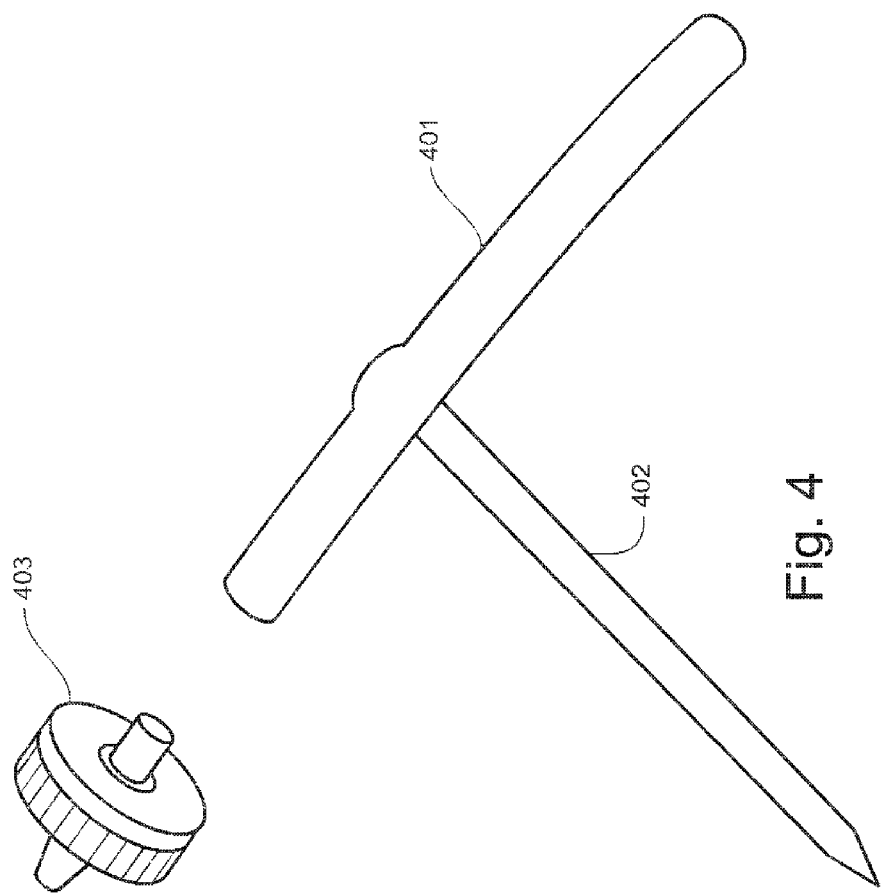

FIG. 4 shows how emitters may be attached to a lateral water feed line 217. Here is shown a (preferably, not limiting) ¼" vinyl tubing 401, a small stake 402 which clamps onto the vinyl tubing, and a pressure controlled dripper 403.

Figure 5:
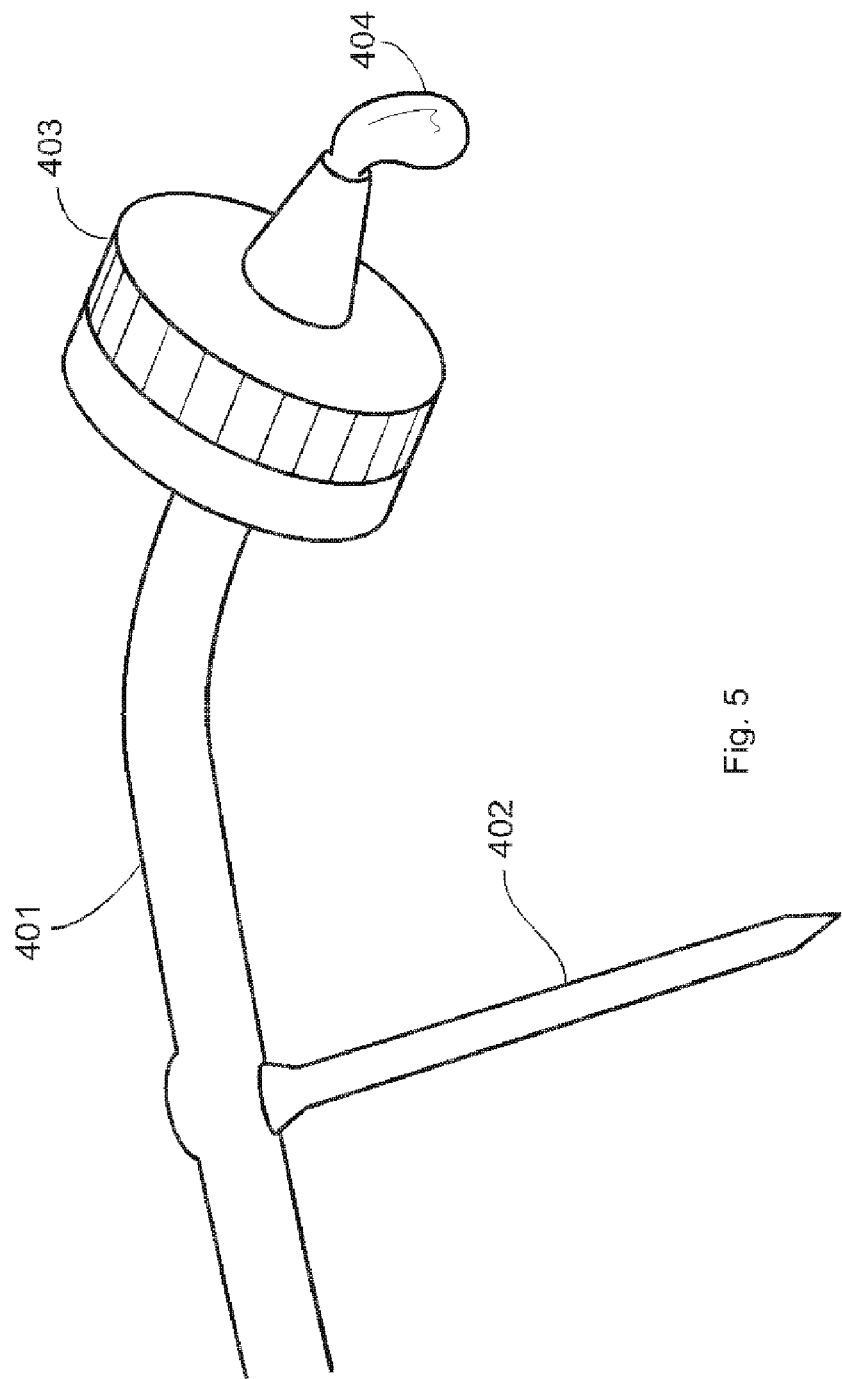

FIG. 5 illustrates dripper 403 use. Here again we see the stake 402, and the ¼" vinyl tubing 401. A water droplet 404 is illustrated emerging from the pressure controlled dripper 403. Single moisture drops do not fully saturate a wide area, and so such a configuration is not desirable for this invention.

Figure 6:
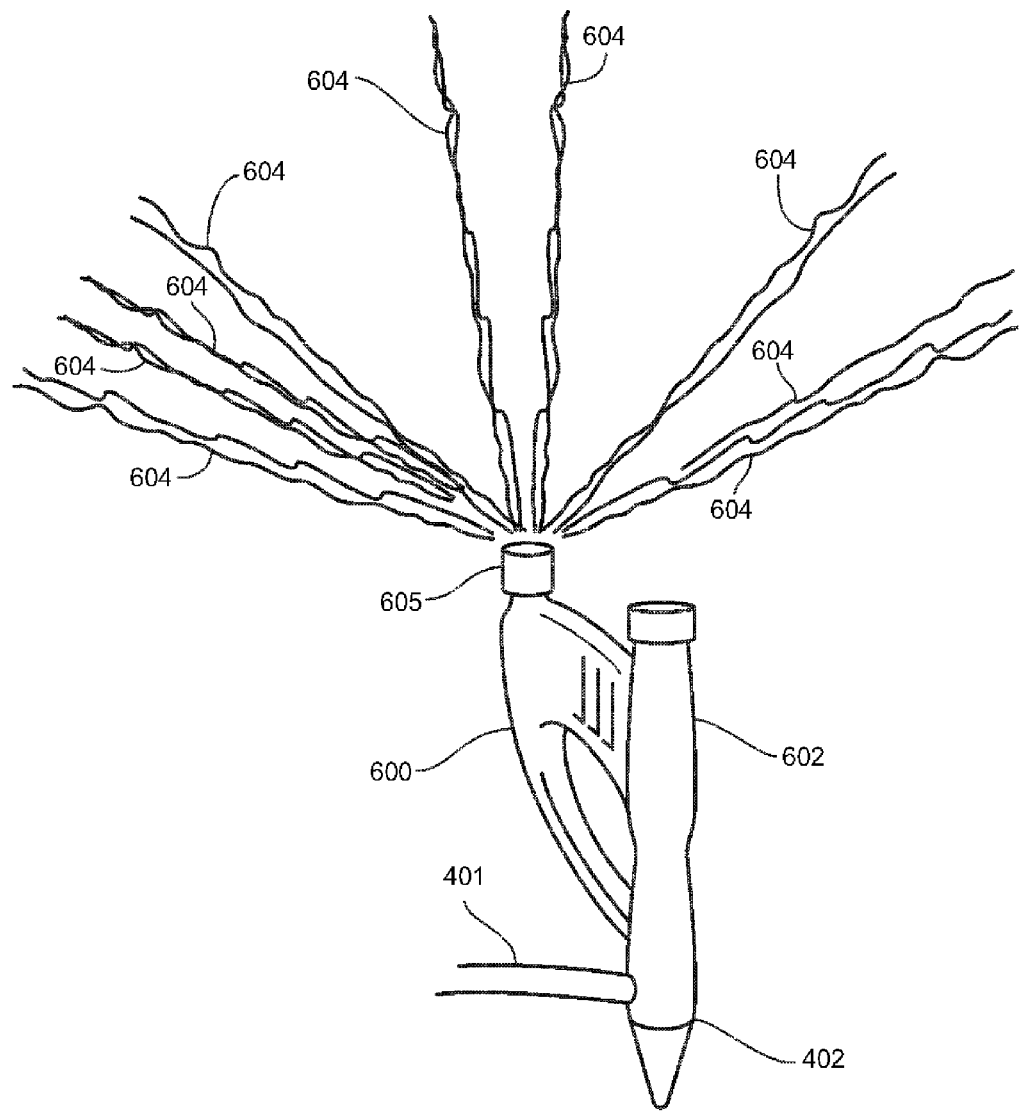

FIG. 6 shows another, preferred type of emitter comprising a sprinkler 600 with stake 402 and ¼" vinyl tubing 401. Water streams 604 emerge from sprinkler head 605. It is to be observed how much further the water stream travels from a sprinkler as opposed to a dripper. It should also be clear in light of FIG. 1, that such a sprinkler configuration ideally lends itself to configuring each of the irrigation source outlets relative to all source outlets immediately adjacent thereto such that, when activated, water emanating from at least one of the source outlets is capable of reaching substantially all positions over at least 50% of the surface area of the filter bed.

Figure 7:
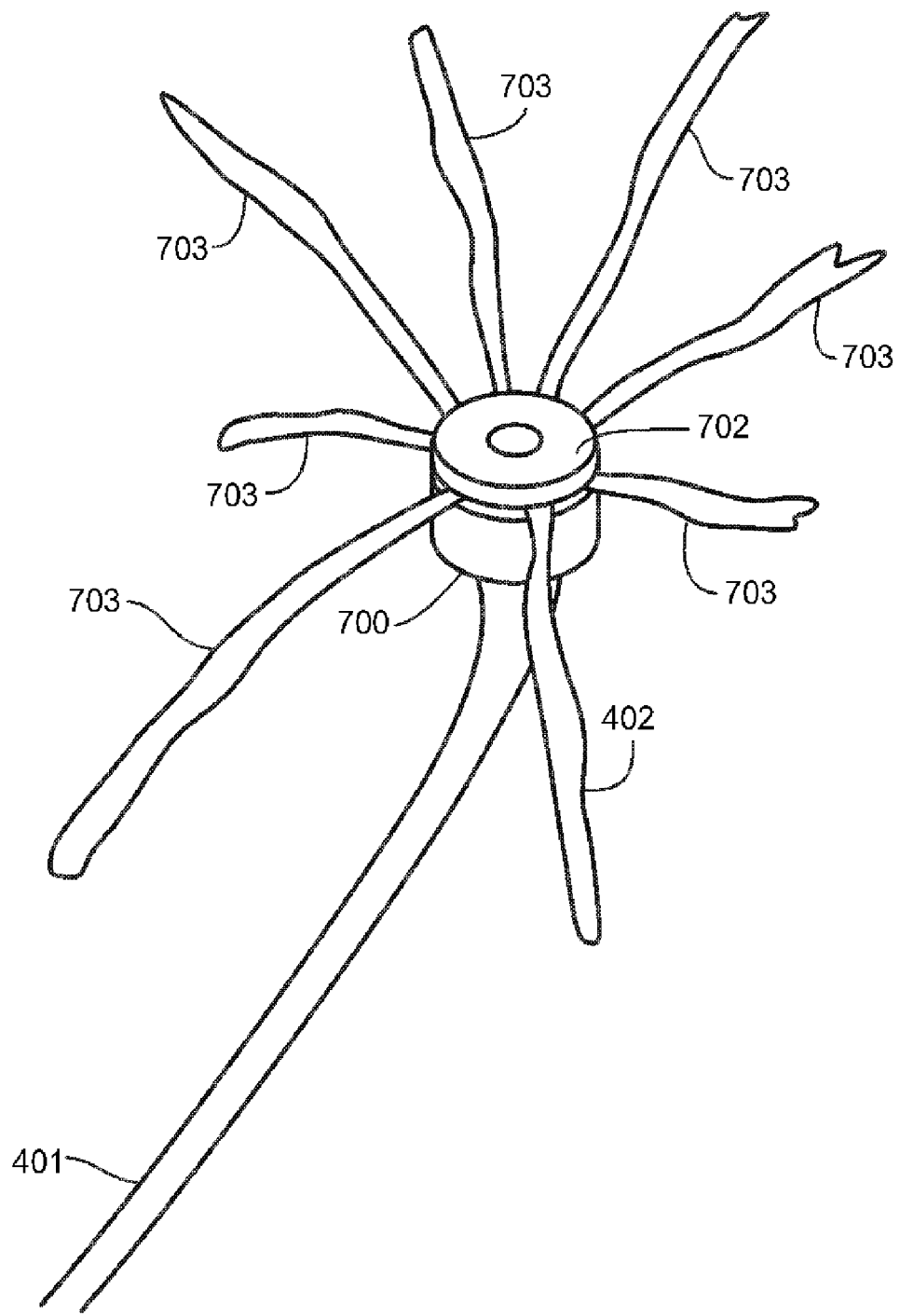

FIG. 7 shows still another type of emitter, namely a bubbler 700. Here is shown the ¼" vinyl tubing 401, a stake 402, the bubbler head 702 and the bubbler water streams 703 coming from the bubbler head. Here it is to be observed how the bubbler water streams 703. The water stream from a bubbler is thicker than the sprinkler water stream 604. However, the bubbler water stream usually will not travel as far as the sprinkler water stream given the same amount of pressure coming through the spaghetti like water supply tubing 401. As such, while an emitter of the type illustrated in FIG. 7 is acceptable, the emitter of FIG. 6 is preferred. Further, without reciting the detailed specifications of dripper 403, sprinkler 600 and bubbler 700, these three types of emission device, as individual components, are known in the art. Therefore, we hereby incorporate into this disclosure, those technical specifications of these three emitter types such as length and thickness of water stream, etc., which are known to those of ordinary skill in the art.

Figure 8:
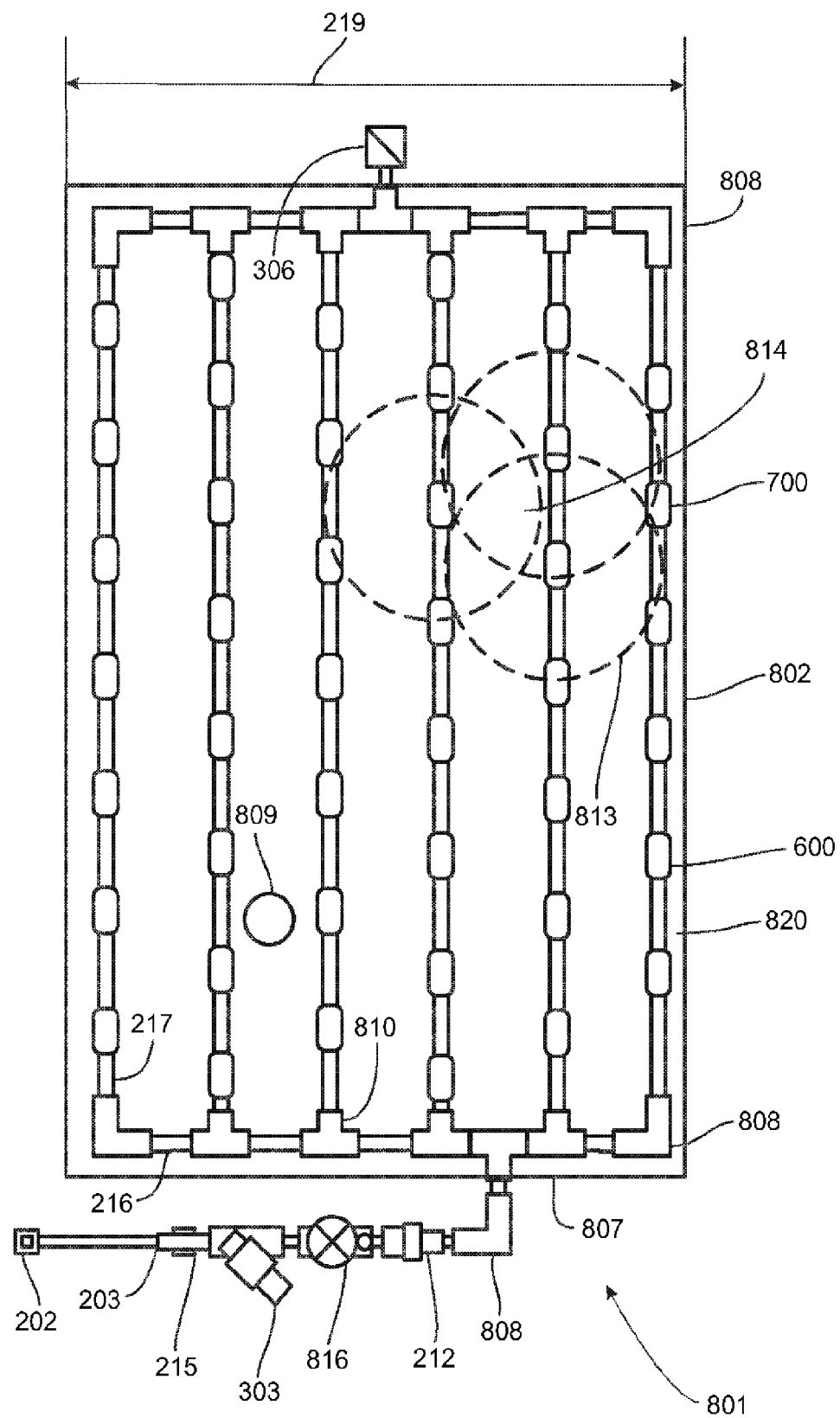

FIG. 8 shows a top down version of a micro irrigation system used within one embodiment of the present invention. The high efficiency plant air purifier 801 comprises one or more trays 802 in which the filter bed material 820 is placed shown as the gray area in the diagram. The filter bed is comprised of the filter bed material in the trays. These emitters 600 and 700 emit water at 30 pounds per square inch or less. Also illustrated are a water source 202, a shutoff valve 215, a filter 303, a control valve 816, a pressure regulator 212, T connectors 807, a main line 203, a sub main line 216, lateral lines 217, elbow connectors 808, a moisture sensor 809, compression or insert fittings 810, a tubing end closure 306. Plus there are a series of lateral lines composed of spaghetti like water tubing, for example not limitation, ¼ inch thick. Finally there is the planted area itself 219.

The dashed circular lines in FIG. 8 show emitter coverage and the overlapping circles 813 represent the saturation overlap area 814 due to the configuration and water projection of the various emitters. As discussed earlier, each of the irrigation source outlets (emitters 600, 700) is configured relative to all source outlets immediately adjacent thereto such that, when activated, water emanating from at least one of the source outlets is capable of reaching substantially all positions over at least 50% of the surface area of the filter bed. Alternatively, this shows how water from the micro-irrigation system is projected so as to reach substantially all of a bioregenerative portion of the filter bed, where it is understood that this bioregenerative portion comprises at least 50% of said filter bed. Thus, the three-circle "sample" in this figure illustrates an example of how this overlapping, substantially-uniform coverage is understood to be configured. Also, the emitters in FIG. 8 are configured so as to be staggered from one lateral line to the next, thus forming an approximate "equilateral triangle" with all of the desirable geometric properties attendant thereto. Nonetheless, other geometric configurations may also be considered, including other triangular arrangements, as well as square grids, hexagons, etc., and their respective geometric properties, individually or in combination, and without limitation as to geometric configuration.

Figure 9:
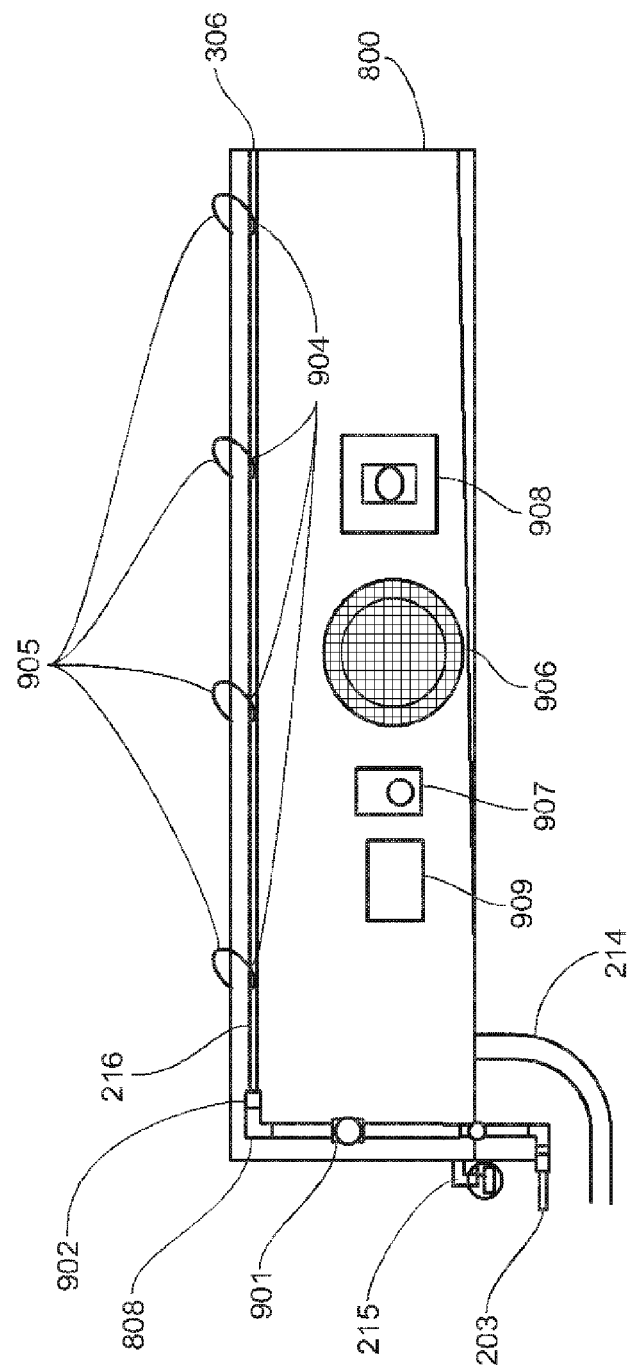

FIG. 9 shows a side view 800 of the exterior of a high efficiency plant air purifier. Here there is an electronic control valve or solenoid 215, a pressure regulating "Y" filter 901 which is a combination of a filter and pressure regulator, an elbow connector 808, a reduction fitting 902 from the main to the sub main line, a sub main line 216, a tubing end closure 306, reduction fittings from the sub main lines to the lateral feeds 904, lateral line feeds 905, an induction fan 906, a high low fan switch 907, a moisture controller 908, a drain 214, and a timer or programmable computer relay with timer capabilities 909 to control the timing of water delivery and airflow, and any other suitable operational parameters as noted in the earlier discussion.

Figure 10:
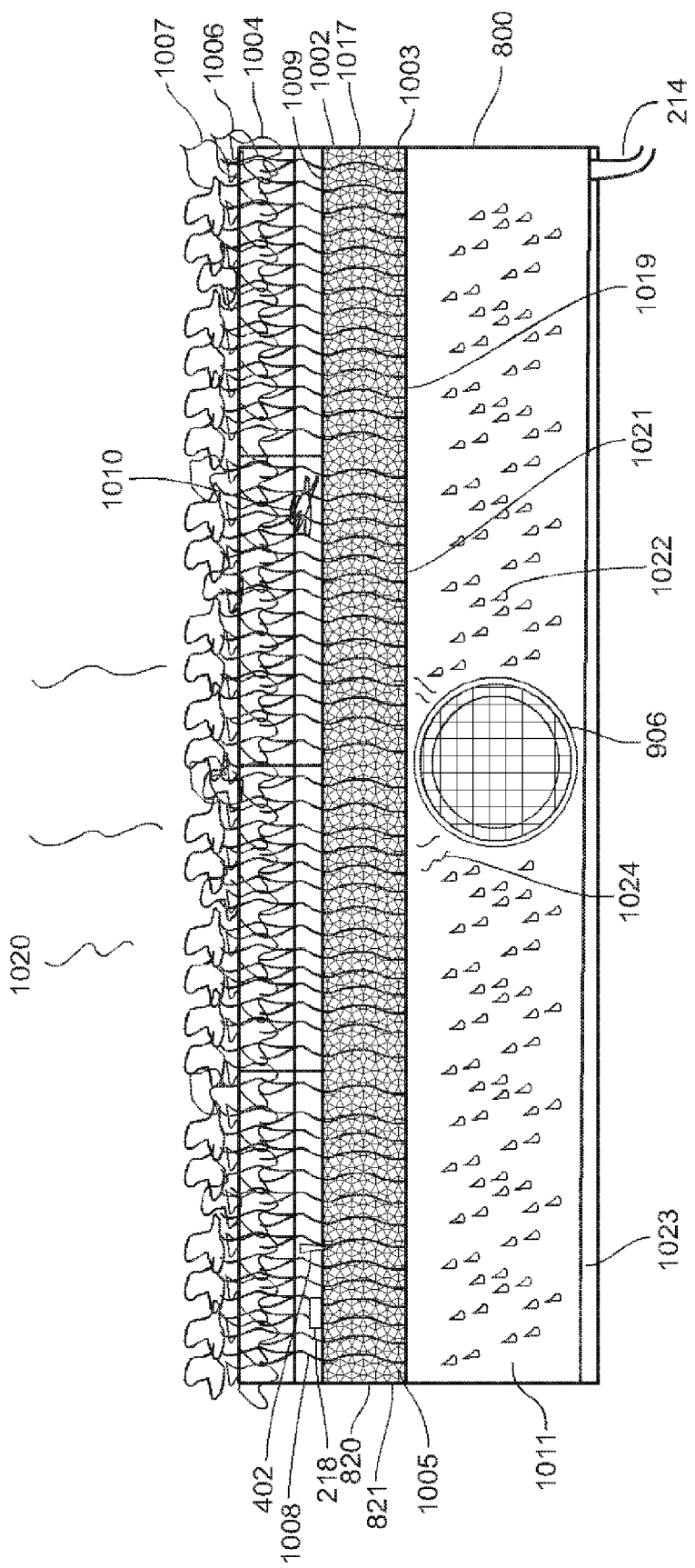
FIG. 10, shows a side plan view of the interior of a high efficiency plant air purifier, with the outer wall of FIG. 9 cut away.

FIG. 10, shows a side view interior shot of a high efficiency plant air purifier for FIG. 9, with the outer wall cut away. Within the high efficiency air purifier 800 is a filter bed 820. This filter bed comprises a porous granular material, which as noted earlier, comprises expanded shale, expanded clay and/or perlite shown in white 1002, and activated carbon 1003. Such material may also comprise diatomaceous earth, pumice, pozzalon, or any other porous substance as well. Plants 1004 grow therein with their roots embedded in this material. Around the roots are microbes 1005 which will disperse themselves throughout the filter bed and bioregenerate that filter bed by digesting any pollutants 1017 caught therein. As noted, however, these microbes will only disperse (transport) to and thus bioregenerate moisturized areas of the filter bed, which is why it is important to project the water so as to reach substantially all of the portion of the filter bed intended for bioregeneration. Above the filter bed is a canopy 1006 upon which plant leaves 1007 lie, and which keep the plants stems 1008 from falling over and lying on the filter beds surface 1009. This keeps the filter bed free to receive the substantially-uniform distribution of water throughout to enable microbial transport and bioregeneration. Upon the filter bed, emitters 218 may rest or be attached via stakes 402. The majority of the emitters are to be situated 12 inches or less from the top surface of the filter bed, and in particular below the predominant leaf line, so as to ensure a projection of water substantially unobstructed by the plant leaves. Moisture droplets 1010 which comes from the emitters saturate the filter bed and pass through into the lower chamber of the invention 1011. Contaminated air 1020 which is moved down (or up) through the filter bed becomes purified air 1024 and is then pulled (or pushed) out of the chamber by the induction fan 906. Activated carbon is a chemical adsorbent 1021. The moisturized filter bed acts as a wet scrubber 1019 while unclean air 1020 is pulled through it. Excess water 1022 not retained by the filter bed drops down to the floor of the unit and exits out the drain 214 therein. There is preferably a slight slope 1023 to the bottom of the chamber so that water will more-readily move to the drain and not build up inside the unit itself.

Figure 11:
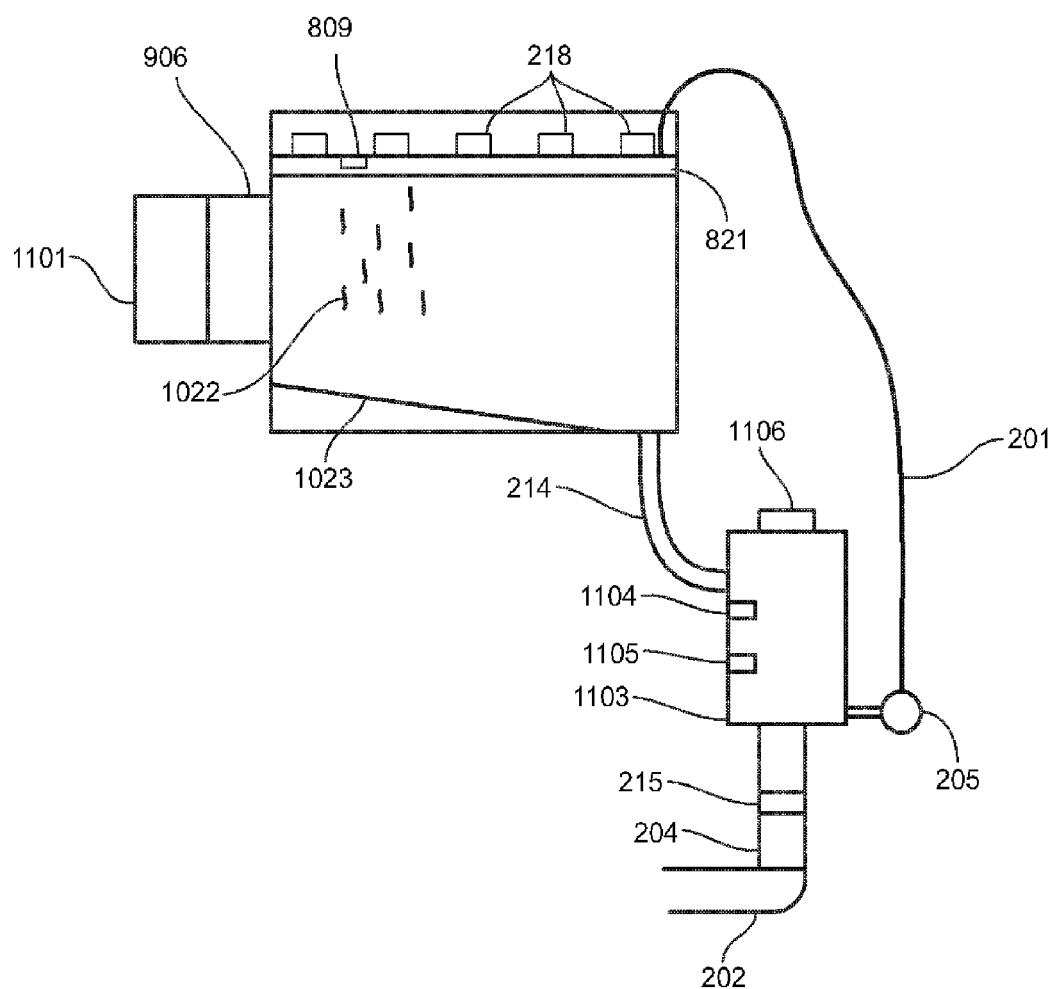
FIG. 11 shows a side plan view of the high efficiency plant air purifier with a UV light to prevent mold and mildew and a reservoir for water recirculation, in accordance with an embodiment of the invention.

FIG. 11 shows the high efficiency plant air purifier with a UV light 1101 and a reservoir 1103 for re-circulation of the water which comes from the micro irrigation system after at least one passage through the filter bed 821. In this configuration excess water 1022 drops down to the bottom of the unit 1023 and passes through a drain 214, where it flows into the reservoir 1103. After most of the excess water 1022 which drains from the unit has had enough time to drain down into the reservoir, the solenoid intake valve 215 or equivalent is activated and allows pressurized water to enter the reservoir from the building's indoor water feed 202. This water than passes through a pre filter 204 prior to entering the reservoir 1103. This fills reservoir 1103 to a height where a float valve or reed switch 1104 or equivalent closes the solenoid intake valve 215. When moisture in the filter bed becomes too low a signal from the moisture sensor 809 or the computer timer 909 sends a signal which activates the pump 205. The pump pulls water out of the reservoir 1103 and allows it to pass through other parts of the micro-irrigation system 201 which than moistens the filter bed 821 to the desired level. Once the micro-irrigation system shuts off and after excess water has had a chance to drain down into the reservoir, if the water level in the reservoir is below the lower reed switch 1105 it triggers the solenoid intake valve 215 to open, thus refilling the reservoir. At the top of the reservoir is a cap 1106 or equivalent through which nutrients can be added for plant nourishment. This will mix with water in the reservoir and pass through the emitters 218 in the micro irrigation system, and moisten the filter bed 821, from which the plants' roots can draw nutrients up into the bodies of the plants themselves.

Figure 12:
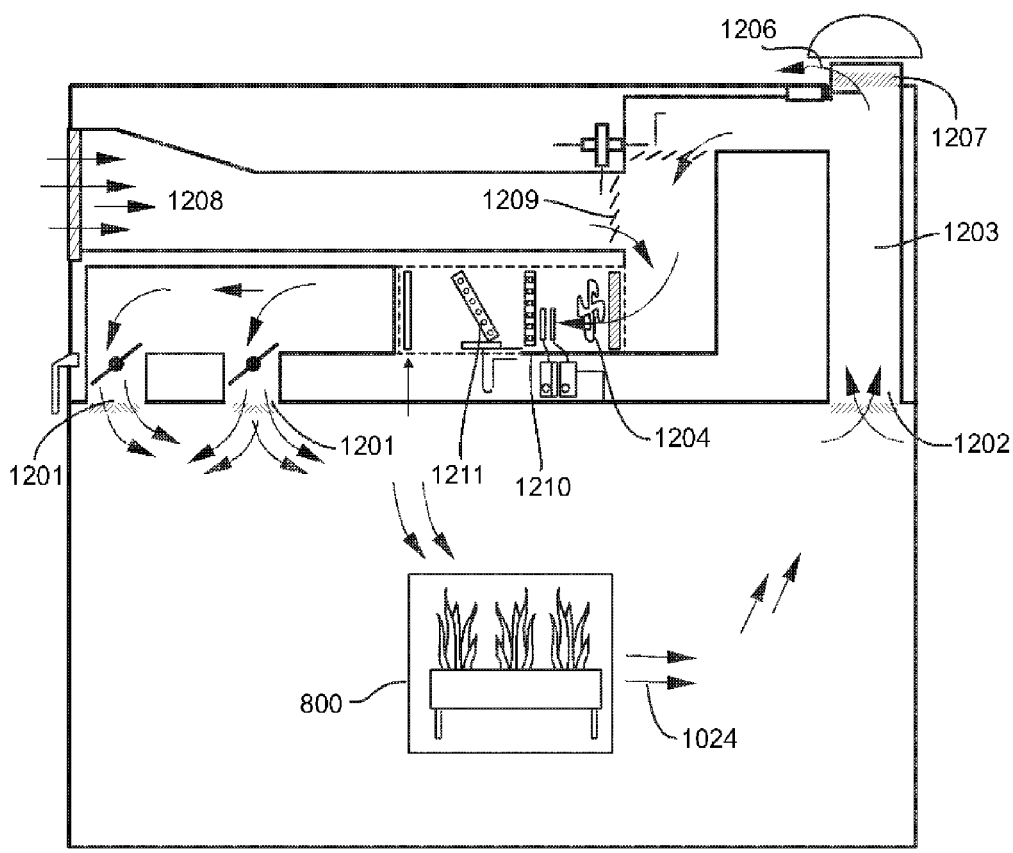
FIG. 12 shows a side plan view of the high efficiency plant air purifier as a free standing unit, in accordance with an alternative preferred embodiment.

FIG. 12 shows the high efficiency plant air purifier 800 in a free-standing embodiment. Here, air entering the room through the supply air diffusers 1201 will be pulled down into the plant air purifier 800 which will than exit back into the same room. This purified air 1024 is then drawn up through the return air grill 1202 and enters the ducting system 1203 because of the fan 1204 in the HVAC system. This same air will eventually return through the supply air diffusers 1201. By having a high efficiency plant air purifier in a building, far less exhaust air 1206 leaves the building. Hence the damper to the exhaust vent 1207 will be closed most of the time. With less air being exhausted out, less outdoor air needs to enter through the air intake 1208. This means that the outdoor air damper 1209 will be closed most of the time as well. For all intents and purposes the system will operate as a closed system and the high efficiency plant air purifier will have done away with much of the need for outdoor air mechanical ventilation. As a result there will be a considerable saving on heating and cooling costs. Consequently, both the heating coil 1210 and the cooling coil 1211 will not operate as often.

Figure 13:
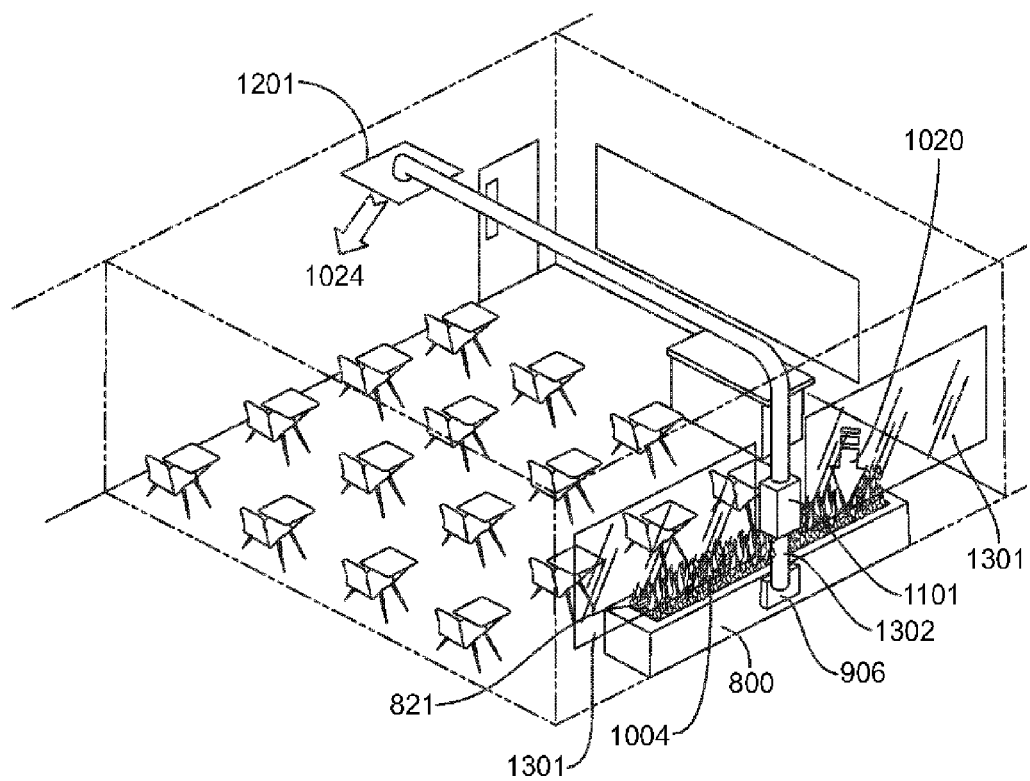
FIG. 13 illustrates in schematic perspective view of the high efficiency plant air purifier directly attached to a duct which takes the purified air once it leaves the unit and exhausts it out elsewhere in the building (in this example, at the other end of the room).

FIG. 13 shows the high efficiency plant air purifier directly attached to a duct which takes the purified air once it leaves the unit and exhausts it out at the other end of the room (or elsewhere in the habitable structure). In this illustration the high efficiency plant air purifier 800 is placed next to two light sources, e.g., windows 1301 so that the plants 1004 within the invention may receive sunlight. Alternatively, suitable artificial growing lights may be employed as light sources. Stale contaminated air 1020 is pulled down into the unit by the fan motor 906. After passing through the filter bed 821 the stale air is purified. It enters a duct 1302 where a UV light 1101 kills any unhealthy mold, mildew or airborne bacteria which the plant air purifier did not remove. Whereupon the now clean and healthy purified air 1024 reenters the room through a supply air diffuser 1201.

Figure 14:
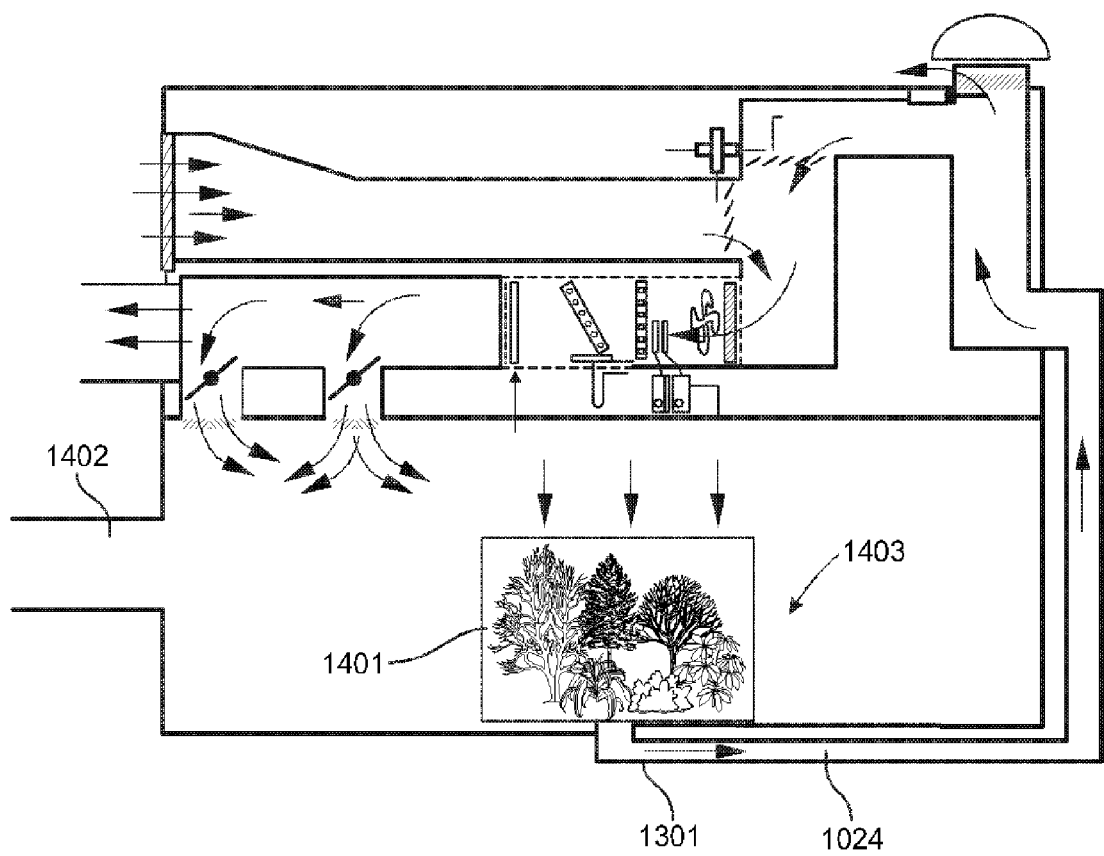
FIG. 14 is the same as FIG. 12, but comprising an arboretum high efficiency plant air purifier.

FIG. 14 is the same as FIG. 12 except that there is an arboretum high efficiency plant air purifier 1401 which functions much like the normal high efficiency plant air purifier, save that it has a larger filter bed and often has trees as well as plants. For the purposes of this patent an arboretum is here defined as a space where trees and shrubs are cultivated for exhibition. Such an arboretum high efficiency plant air purifier is preferably placed in an atrium to which all stale and contaminated air from the entire structure is directed, via 1402. This air is pulled down into the filter bed in which both the trees and plants grow, and the purified air 1024 is then ducted 1301 out of the atrium into the HVAC system of the building itself, where it re-circulates throughout the building.

Figure 15:
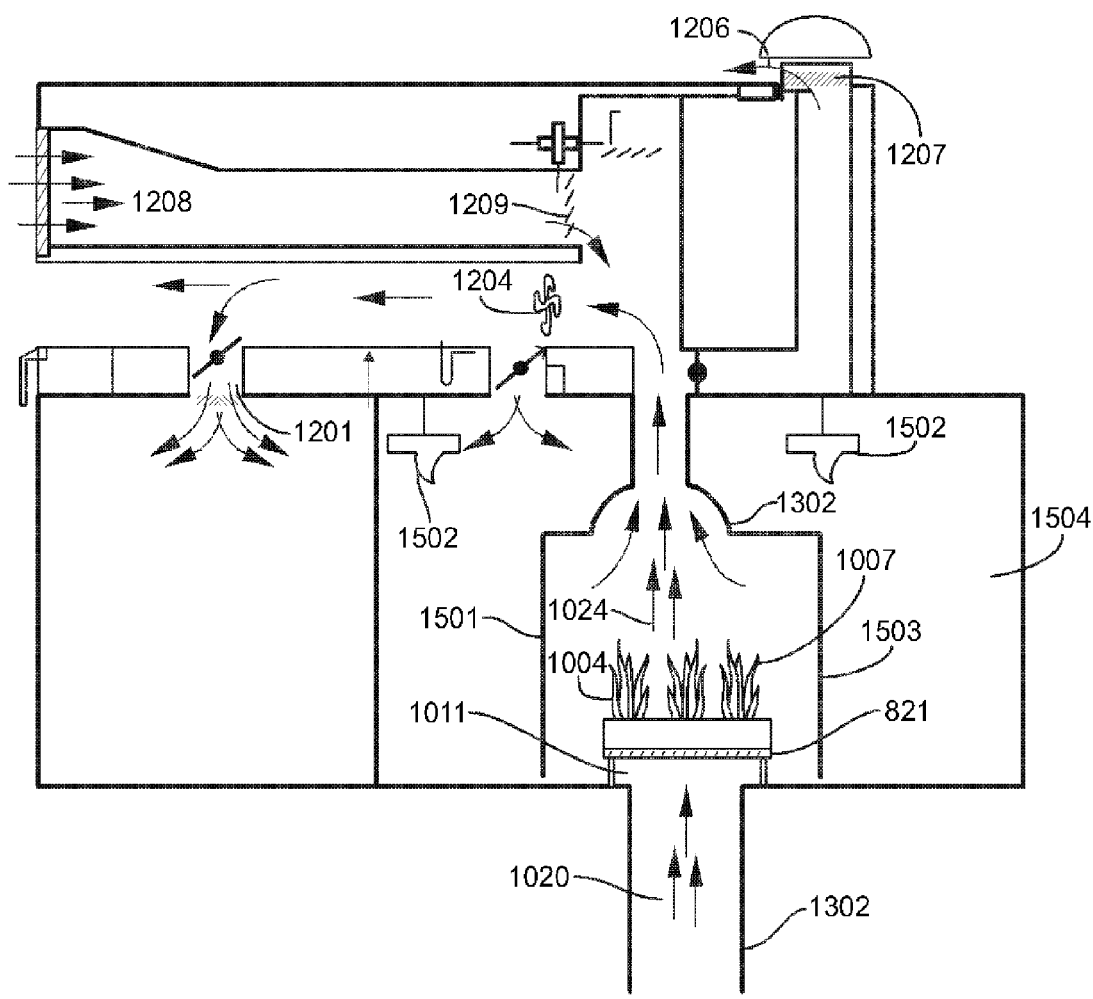
FIG. 15 is a side plan view which illustrates the high efficiency plant air purifier working in reverse, in an alternative preferred embodiment.

FIG. 15 shows the high efficiency plant air purifier working in reverse, i.e., with air moved (pushed or pulled) from bottom to top. In this variation of the invention, stale and impure air 1020 from the entire building is ducted 1302 into the lower chamber 1011 of the invention. This air than passes through the filter bed 821 and becomes purified air 1024. It is drawn up past the leaves 1007 of the plants 1004. A clear Plexiglas (or equivalent) housing 1501 covers the entire plant bed as well as additional space 1504, and substantially seals the filter bed and plants within the ducting system. There is a door 1503 or other access portal which allows entry into the space where the invention is situated, so that any necessary maintenance can easily be done. Because this chamber or housing is substantially transparent, sunlight or light from any fixtures 1502 in the room can enter and photosynthesis can take place. This terrarium-like structure is substantially airtight and a duct 1302 connected above the plant bed draws the now pure air 1024 into the HVAC system of the building, and past the dampers 1207 where exhausted air 1206 is vented out of the building. This pure air 1024 is drawn into the HVAC system by the fan 1204 in the HVAC system itself. This pure air enters some or all of the rooms in the building through the supply air diffusers 1201 in those rooms. Because air is being purified within the building less outdoor air 1208 needs to enter and the outdoor air damper 1209 can be closed almost all of the time.

Figure 16:
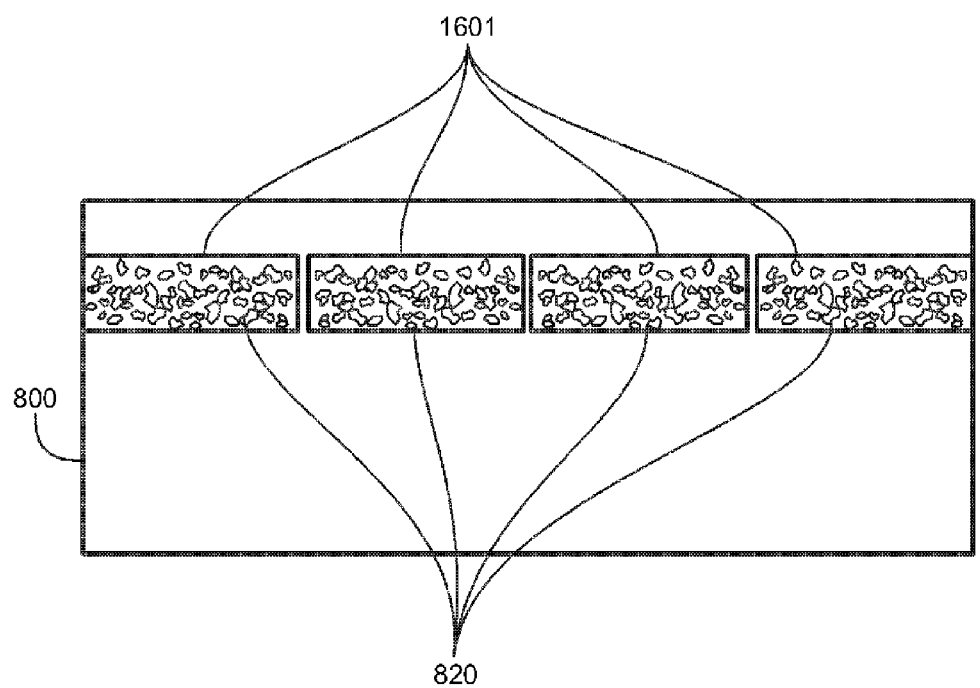
FIG. 16 is a side plan view which illustrates the high efficiency plant air purifier comprising a plurality of removable trays containing the filter bed material.

FIG. 16 shows where the high efficiency plant air purifier 800 has within it a series of removable trays 1601 which contain the filter bed material 820.

Figure 17:
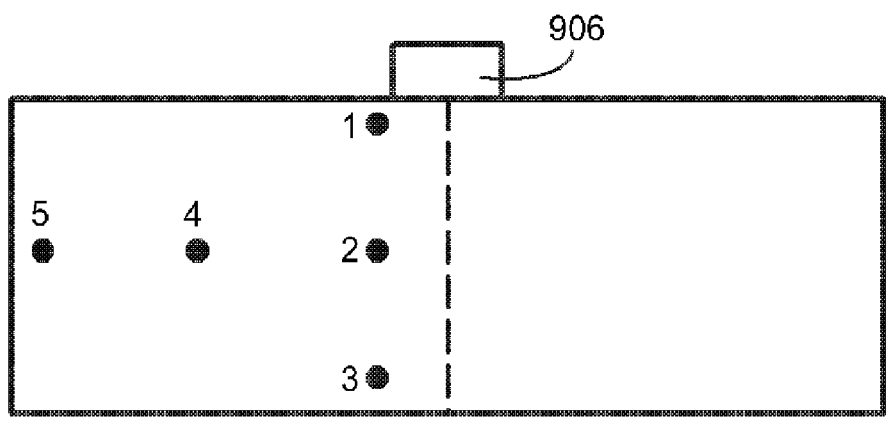
FIG. 17 illustrates the positions of an experimental version of the invention at which the pressure drop readings of FIG. 1 were taken.

FIG. 17, as previously noted, illustrates the "SP1" through "SP5" positions of an experimental version of the invention at which the pressure drop readings of FIG. 1 were taken.

The knowledge possessed by someone of ordinary skill in the art at the time of this disclosure is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

We claim:

1. A system for purifying indoor air (1020) comprising:
   a filter bed (820, 821) comprising a growing medium with growing plants (1004) rooted therein and configured to be capable of sustaining an airflow (1021) therethrough between a top surface (1009) thereof and a bottom surface thereof, said filter bed comprising a substantially horizontal portion thereof;
   an irrigation system (201) comprising a plurality of irrigation source outlets (218, 600, 700) for delivering water (404, 604,703,813,814,1010) to said filter bed (820, 821) in a substantially-uniform fashion;
   an active region of said filter bed comprising that region of said filter bed configured so as to substantially have said airflow (1021) flowing therethrough; and
   said irrigation system (201) configured such that water (404, 604,703,813,814,1010) therefrom is capable of being projected so as to reach at least 50% of said top surface (1009) of said active region and top down moisturizing said active region; wherein:
   at least some of said irrigation source outlets (218, 600, 700) are situated below a predominant leaf line (1006) of said plants (1004) so as to ensure a projection of water substantially unobstructed by the plant leaves (1007), at least some of said outlets projecting water (404, 604, 703,813,814,1010) above said top surface (1009) of said active region; and
   at least some of said irrigation source outlets (218, 600, 700) are capable of projecting water emanating therefrom over a radius of at least two inches therefrom.

2. The system of claim 1, said irrigation system (201) configured such that water being projected (604, 703) so as to reach at least 70% of said top surface (1009) of said active region.

3. The system of claim 1, said irrigation system (201) configured such that water (404, 604,703,813,814,1010) therefrom is capable of being projected (604, 703) so as to reach at least 90% of said top surface (1009) of said active region.

4. The system of claim 1, said irrigation system (201) configured such that water (404, 604,703,813,814,1010) therefrom is capable of being projected (604, 703) so as to reach substantially all of said top surface (1009) of said active region.

5. The system of claim 1, wherein:
   at least 50% of said irrigation source outlets (218, 600, 700) are capable of projecting water (604, 703) emanating therefrom over a radius of at least two inches therefrom; and
   each of said irrigation source outlets (218, 600, 700) is configured relative to all source outlets (218, 600, 700) immediately adjacent thereto such that, when activated, water (404, 604,703 813,814,1010) emanating from at least one of said source outlets (218, 600, 700) is capable of reaching substantially all positions over at least 50% of the surface of said filter bed (1009).

6. The system of claim 5, said at least 50% of the said source outlets (218, 600, 700) comprising at least 70% thereof.

7. The system of claim 5, said at least 50% of the surface of said filter bed (1009) comprising at least 90% thereof.

8. The system of claim 1, wherein most of said source outlets (218, 600, 700) are situated twelve inches or less from a top surface (10009) of said filter bed (820, 821).

9. The system of claim 1, further comprising:
   integrating said filter bed (820, 821) and plants (1004) rooted therein, into a ducting system (1203) of a habitable structure.

10. The system of claim 1, further comprising:
    at least one canopy (1006) and/or trellis for substantially preventing plants (1004) rooted in said filter bed (820, 821) from contacting said filter bed, thereby facilitating said delivering water (404, 604,703 813,814,1010) to said filter bed (820,821) in a substantially-uniform fashion (813, 814).

11. The system of claim 1, further comprising an ultra violet light (1101) for application to air (1020) flowing out of said filter bed (820, 821), for reducing mold and mildew.

12. The system of claim 1, further comprising:
    a moisture sensor (809) for sensing a level of moisture in said filter bed (820, 821); and
    a controller (908) responsive to said moisture sensor (809), for controlling the water (404, 604,703 813,814,1010) emanating from said source outlets (218, 600, 700).

13. The system of claim 1, further comprising:
    a controller (908) which controls an airflow through said filter bed (820, 821), in predetermined relation to when water (404, 604,703 813,814,1010) is being delivered to said filter bed (820, 821).

14. The system of claim 1, further comprising:
    a controller (908) which controls an airflow through said filter bed (820, 821), in predetermined relation to when excess water (1022) is being drained from said filter bed (820, 821).

15. The system of claim 13, said predetermined relation comprising said airflow being inactive when water (404, 604, 703 813,814,1010) is being delivered to said filter bed (820, 821).

16. A method for purifying indoor air (1020) comprising:
    providing a filter bed (820, 821) comprising a growing medium (1002, 1003, 820) suitable for growing plants (1004) rooted therein and configured to be capable of sustaining an airflow (1021) therethrough between a top surface (1009) thereof and a bottom surface thereof, said filter bed comprising a substantially horizontal portion thereof;
    growing plants (1004) within said growing medium (1002, 1003, 820);
    delivering water (404, 604,703 813,814,1010) to said filter bed (820, 821) in a substantially-uniform fashion (813, 814), using an irrigation system (201) comprising a plurality of irrigation source outlets (218, 600, 700) therefor;
    projecting water (404, 604,703 813,814,1010) from said irrigation system (201) so as to reach at least 50% of said top surface (1009) of an active region of said filter bed (820, 821) and top down moisturizing said active region, said active region comprising that region of said filter bed (820, 821) configured so as to substantially have said airflow flowing therethrough;
    situating at least some of said irrigation source outlets (218, 600, 700) below a predominant leaf line (1006) of said plants (1004) so as to ensure a projection of water substantially unobstructed by the plant leaves (1007), at least some of said outlets projecting water (404, 604, 703,813,814,1010) above said top surface (1009) of said active region; and at least some of said irrigation source outlets (218, 600, 700) projecting water emanating therefrom over a radius of at least two inches therefrom.

17. The method of claim 16, said at least 50% of said top surface (1009) of said active region comprising at least 70% of said top surface (1009) of said active region.

18. The method of claim 16, said at least 50% of said top surface (1009) of said active region comprising at least 90% of said top surface (1009) of said active region.

19. The method of claim 16, said at least 50% of said top surface (1009) of said active region comprising substantially all of said top surface (1009) of said active region.

20. The method of claim 16, further comprising:
at least a 50% of said irrigation source outlets (218, 600, 700) projecting water (404, 604,703 813,814,1010) emanating therefrom over a radius of at least two inches therefrom; and
configuring each of said irrigation source outlets (218, 600, 700) relative to all source outlets (218, 600, 700) immediately adjacent thereto such that water (404, 604,703 813,814,1010) emanating from at least one of said source outlets (218, 600, 700) reaches substantially all positions over at least 50% of the surface of said filter bed (820, 821).

21. The method of claim 20, said at least 50% of the surface of said filter bed (820, 821) comprising at least 70%.

22. The method of claim 20, said at least 50% of the surface of said filter bed (820, 821) comprising at least 90%.

23. The method of claim 20, said at least 50% of the said source outlets (218, 600, 700) comprising at least 70% thereof.

24. The method of claim 20, said at least 50% of the surface of said filter bed (820, 821) comprising at least 90% thereof.

25. The method of claim 16, further comprising situating most of said source outlets twelve inches or less from a top surface of said filter bed (1009).

26. The method of claim 16, further comprising:
integrating said filter bed (820, 821) and plants (1004) rooted therein, into a ducting system (1203) of a habitable structure.

27. The method of claim 16, further comprising:
facilitating said delivering water (404, 604,703 813,814, 1010) to said filter bed (820, 821) in a substantially-uniform fashion, using at least one canopy (1006) and/or trellis substantially preventing plants (1004) rooted in said filter bed (820, 821) from contacting said filter bed (820, 821).

28. The method of claim 16, further comprising reducing mold and mildew by applying ultra violet light (1101) to air (1020) flowing out of said filter bed (820, 821).

29. The method of claim 16, further comprising:
sensing a level of moisture in said filter bed (820, 821) using a moisture sensor (809) therefor; and
controlling the water (404, 604,703 813,814,1010) emanating from said source outlets (218, 600, 700) using a controller (908) responsive to said moisture sensor (809).

30. The method of claim 16, further comprising:
controlling an airflow through said filter bed (820, 821), in predetermined relation to delivering water (404, 604, 703 813,814,1010) to said filter bed (820, 821).

31. The method of claim 16, further comprising:
controlling an airflow through said filter bed (820, 821), in predetermined relation to when excess water (1022) is being drained from said filter bed (820, 821).

32. The method of claim 30, said predetermined relation comprising inactivating said airflow when delivering water (404, 604,703 813,814,1010) to said filter bed (820, 821).

33. A system for purifying indoor air (1020) comprising:
a filter bed (820, 821) comprising a growing medium with growing plants (1004) rooted therein and configured to be capable of sustaining an airflow (1021) therethrough between a top surface (1009) thereof and a bottom surface thereof, said filter bed comprising a substantially horizontal portion thereof;
an irrigation system (201) comprising at least one irrigation source outlet (218, 600, 700) for delivering water (404, 604,703,813,814,1010) to said filter bed (820, 821) in a substantially-uniform fashion;
an active region of said filter bed comprising that region of said filter bed configured so as to substantially have said airflow (1021) flowing therethrough; and
said irrigation system (201) configured such that water (404, 604,703,813,814,1010) therefrom is capable of being projected so as to reach at least 50% of said top surface (1009) of said active region and top down moisturizing said active region; wherein:
at least some of said irrigation source outlets (218, 600, 700) are situated below a predominant leaf line (1006) of said plants (1004) so as to ensure a projection of water substantially unobstructed by the plant leaves (1007), at least some of said outlets projecting water (404, 604, 703,813,814,1010) above said top surface (1009) of said active region; and
at least some of said irrigation source outlets (218, 600, 700) are capable of projecting water emanating therefrom over a radius of at least two inches therefrom.

34. An arboretum high efficiency plant air purifier (801) where trees and shrubs are cultivated for exhibition in an interior space, where a filter bed of the arboretum (820, 821) and plants (1004) rooted therein are integrated into the ducting system (1203) of a habitable structure, and where said filter bed is configured to be capable of sustaining an airflow (1021) therethrough between a top surface (1009) thereof and a bottom surface thereof.

35. The system of claim 1, said irrigation system comprising a micro-irrigation system.

36. The method of claim 16, said irrigation system comprising a micro-irrigation system.

* * * * *